(12) United States Patent  
Baun

(10) Patent No.: US 11,002,252 B2  
(45) Date of Patent: May 11, 2021

(54) WIND INSTALLATION COMPRISING A WIND TURBINE AND AN AIRBORNE WIND ENERGY SYSTEM

(71) Applicant: Vestas Wind Systems A/S, Aarhus N. (DK)

(72) Inventor: Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/606,884

(22) PCT Filed: May 4, 2018

(86) PCT No.: PCT/DK2018/050092  
§ 371 (c)(1),  
(2) Date: Oct. 21, 2019

(87) PCT Pub. No.: WO2018/206062  
PCT Pub. Date: Nov. 15, 2018

(65) Prior Publication Data  
US 2020/0080540 A1    Mar. 12, 2020

(30) Foreign Application Priority Data

May 11, 2017 (DK) ............................ PA 2017 70335

(51) Int. Cl.  
*F03D 9/30* (2016.01)  
*F03D 7/00* (2006.01)  
(Continued)

(52) U.S. Cl.  
CPC ........... *F03D 9/255* (2017.02); *F03D 7/0268* (2013.01); *F03D 9/35* (2016.05); *H02K 7/1838* (2013.01);  
(Continued)

(58) Field of Classification Search  
None  
See application file for complete search history.

(56) References Cited

U.S. PATENT DOCUMENTS 3,987,987 A * 10/1976 Payne ..................... F03D 5/00  
                                                      244/153 R  
7,830,033 B2 * 11/2010 Meller .................. F03D 80/70  
                                                      290/55  
(Continued)

FOREIGN PATENT DOCUMENTS

CN        101484694 A      7/2009  
CN        102628423 A      8/2012  
(Continued)

OTHER PUBLICATIONS

China National Intellectual Property Administration, First Notification of Office Action in CN Application No. 201880030357.0, dated Aug. 4, 2020.

(Continued)

*Primary Examiner* — Tulsidas C Patel  
*Assistant Examiner* — S. Mikailoff  
(74) *Attorney, Agent, or Firm* — Wood Herron & Evans LLP

(57) ABSTRACT

A wind installation comprising a wind turbine (1) and an airborne wind energy system (12, 13), e.g. in the form of a kite (12) or a glider (13) is disclosed. The wind turbine (1) is electrically connected to the power grid via a power transmission line (27). The wind installation further comprises an airborne wind energy system (12, 13), e.g. in the form of a kite (12) or a glider (13), for generating electrical energy. The airborne wind energy system (12, 13) comprising a separate generator is coupled to the wind turbine (1) via a cable (6) and the separate generator is electrically connected to the power transmission line (27).

16 Claims, 21 Drawing Sheets

(51) Int. Cl.
*F03D 9/25* (2016.01)
*F03D 9/35* (2016.01)
*F03D 7/02* (2006.01)
*H02K 7/18* (2006.01)
*H02K 7/20* (2006.01)
*H02P 9/00* (2006.01)
*H02P 101/15* (2016.01)

(52) U.S. Cl.
CPC ............... *H02K 7/20* (2013.01); *H02P 9/008* (2013.01); *H02P 2101/15* (2015.01)

(56) References Cited

U.S. PATENT DOCUMENTS

| | | | | |
|---|---|---|---|---|
| 8,134,249 | B2* | 3/2012 | Ippolito | B65H 51/14 |
| | | | | 290/55 |
| 2003/0168864 | A1* | 9/2003 | Heronemus | F03D 13/25 |
| | | | | 290/55 |
| 2007/0126241 | A1 | 6/2007 | Olson | |
| 2008/0067816 | A1* | 3/2008 | Garzmann | F03D 80/00 |
| | | | | 290/55 |
| 2012/0104764 | A1* | 5/2012 | Goo | F03D 9/25 |
| | | | | 290/55 |
| 2012/0248770 | A1 | 10/2012 | Byun | |
| 2014/0062094 | A1 | 3/2014 | Chan | |
| 2014/0219799 | A1* | 8/2014 | Selsam | F03D 15/10 |
| | | | | 416/11 |
| 2015/0184629 | A1 | 7/2015 | Vander Lind | |
| 2017/0218925 | A1* | 8/2017 | Vander Lind | B64F 3/02 |
| 2018/0030960 | A1* | 2/2018 | GilroySmith | F03D 80/70 |
| 2019/0055928 | A1* | 2/2019 | Selsam | F03D 9/30 |
| 2019/0072067 | A1* | 3/2019 | Nordstrom | F03D 1/02 |
| 2020/0080540 | A1* | 3/2020 | Baun | F03D 1/02 |
| 2020/0116130 | A1* | 4/2020 | Baun | F03D 9/255 |
| 2020/0132048 | A1* | 4/2020 | Baun | F03D 9/257 |

FOREIGN PATENT DOCUMENTS

| | | | | |
|---|---|---|---|---|
| CN | 103670925 | A | | 3/2014 |
| CN | 105874195 | A | | 8/2016 |
| CN | 106030102 | A | | 10/2016 |
| EP | 2825768 | A1 | | 1/2015 |
| EP | 3184813 | A1 * | 6/2017 | ............ F03D 13/25 |
| IT | UB20159172 | A1 | | 3/2016 |
| WO | 2008004261 | A1 | | 1/2008 |

OTHER PUBLICATIONS

European Patent Office, International Search Report and Written Opinion in PCT Application No. PCT/DK2018/050092, dated Jul. 25, 2018.

Danish Patent and Trademark Office, Search and Exam Report in PA 2017 70335, dated Nov. 9, 2017.

Antonello Cherubini et al., Airborne Wind Energy Systems: A review of the technologies, Renewable and Sustainable Energy Reviews, 51 (2015) 1461-1476.

* cited by examiner

WIND INSTALLATION COMPRISING A WIND TURBINE AND AN AIRBORNE WIND ENERGY SYSTEM

FIELD OF THE INVENTION

The present invention relates to a wind installation comprising a wind turbine which comprise a tower placed on a foundation and at least one nacelle mounted on the tower and carrying a rotor for generating electrical energy for a power grid. The wind installation of the invention further comprises an airborne wind energy system.

BACKGROUND OF THE INVENTION

Modern wind turbines are used for generating electrical energy for a power grid. To this end, a set of wind turbine blades coupled to a rotor are directed into the incoming wind, and the energy of the wind is extracted by the wind turbine blades and causes the rotor to rotate, thereby converting the energy of the wind into mechanical energy. The rotor is connected to a generator, either directly or via a gear arrangement, and thereby the mechanical energy of the rotating rotor is converted into electrical energy. The electrical energy is supplied to a power grid, via suitable components.

The power production of a wind turbine depends on the wind conditions at the site of the wind turbine, including the wind speed. At wind speeds below a specified minimum wind speed, sometimes referred to as the cut-in wind speed, no electrical energy is generated by the wind turbine. At wind speeds between the cut-in wind speed and a nominal wind speed, the power produced by the wind turbine gradually increases as the wind speed increases, until a nominal power production is reached at the nominal wind speed. At wind speeds above the nominal wind speed, the power production of the wind turbine is limited to the nominal power production. However, at wind speeds above a maximum wind speed, sometimes referred to as the cut-out wind speed, the wind turbine is stopped or operated at reduced power production in order to prevent damage to the wind turbine.

A power transmission line connecting the wind turbine to the power grid will normally be designed to handle a certain power level. This may also be the case for various components of the wind turbine, such as transformer, converter, etc. Accordingly, when the power production of the wind turbine is below this design level, the capacity of the power transmission line is not utilised to the full extent. It is therefore desirable to be able to utilise this additional capacity.

Various airborne wind energy systems, being capable of capturing wind energy at a higher altitude than traditional wind turbines, are known. Common to these systems is that a part of the system is launched to a high altitude, where energy of the wind is harvested. The harvested energy is transferred to a base station, either in the form of mechanical energy or in the form of electrical energy. In the case that the transferred energy is in the form of mechanical energy, a generator will normally be arranged at the base station in order to convert the mechanical energy into electrical energy. In the case that the transferred energy is in the form of electrical energy, the airborne wind energy system comprises an airborne generator, i.e. the part of the system which is launched to a high altitude includes a generator. The part of the airborne wind energy system being launched to a high altitude may, e.g., include a kite or a glider.

A number of airborne wind energy systems are described in Cherubini, et al., 'Airborne Wind Energy Systems: A review of the technologies', Renewable and Sustainable Energy Reviews, 51 (2015) 1461-1476.

US 2007/0126241 discloses a wind driven apparatus for an aerial power generation system including driven elements and controls. The driven elements are configured and shaped to provide maximum force from both lift and drag during the downwind phase of operation and minimum force during the upwind phase. The driven elements have a sail portion with a leading edge and a trailing edge. The controls change the driven elements between high force configurations for downwind operation and low force configurations for upwind operation, adjust the pitch and azimuth angles of the driven elements, and control the camber. In one embodiment, the driven elements are attached to a shaft being rotatably mounted on a nacelle on top of a tower.

DESCRIPTION OF THE INVENTION

It is an object of embodiments of the invention to provide a wind installation in which the total capacity of a power transmission line connecting the wind turbine to a power grid is utilised to a greater extent.

It is a further object of embodiments of the invention to provide a wind installation in which the total power production of the geographical site of the wind turbine is increased.

According to a first aspect, the invention provides a wind installation comprising a wind turbine and an airborne wind energy system, the wind turbine comprising a tower placed on a foundation on a wind turbine site, the wind turbine further comprising at least one nacelle mounted on the tower and for each nacelle, a rotor coupled to the nacelle and being rotatable about an axis of rotation, the rotor being connected to a generator for converting energy of the rotating rotor into electrical energy for a power grid, the wind turbine being electrically connected to the power grid via a power transmission line, the airborne wind energy system comprising a separate generator for generating electrical energy, the airborne wind energy system being coupled to the wind turbine via a cable and the separate generator being electrically connected to the power transmission line.

Thus, the wind turbine of the invention comprises a tower with a nacelle mounted thereon, and with a rotor coupled to the nacelle. Thus, the wind turbine generates electrical energy for a power grid by converting the energy of the wind into electrical energy, essentially in the manner described above. The wind turbine is connected to the power grid via a power transmission line, in order to be able to supply the generated electrical energy to the power grid.

The wind installation further comprises an airborne wind energy system for generating electrical energy. The airborne wind energy system is coupled to the wind turbine via a cable. Accordingly, the airborne wind energy system is mechanically attached to the wind turbine by means of the cable. Thereby a separate site for installing the airborne wind energy system is not required. Instead, the site which is already allocated for the wind turbine is also used for accommodating the airborne wind energy system. This increases the potential total power production per area unit, and thereby a large power production can be reached without requiring excessive areas to be cleared or prevented from other usage.

An "airborne wind energy system" is herein defined as a system comprising a base station and a part which is launched to a higher altitude than the base station and being capable of capturing wind energy. The base station and the part which is launched to a higher altitude are connected by a cable. The harvested energy is transferred to a base station, either in the form of mechanical energy or in the form of electrical energy.

The cable may be electrically conductive. In this case the cable may be configured for transmitting power in the form of AC current or DC current and/or for transmitting communication signals. As an alternative, the cable may merely be configured for mechanically attaching the airborne wind energy system to the wind turbine, but is not used for transmitting electrical current. In this case the cable may, e.g., be in the form of a rope, a wire or the like. The cable may be made at least partly from a durable material, e.g. a synthetic fibre material, such as Kevlar®. In this case the cable may, e.g., be capable of handling expected tensile loads from the airborne wind energy system. For instance, the cable may comprise an electrically conductive core enclosed by a synthetic fibre material, thereby providing a cable which is electrically conductive as well as durable.

Furthermore, at least some infrastructure may be used for the wind turbine as well as for the airborne wind energy system. This could, e.g., include roads, foundation, service equipment, power lines, etc. Service personnel may also perform service or maintenance on the wind turbine and the airborne wind energy system during a single service visit to the site, thereby reducing the total time the service personnel needs to spend in order to perform service or maintenance.

The airborne wind energy system is further electrically connected to the power transmission line which connects the wind turbine to the power grid. Accordingly, the electrical energy produced by the airborne wind energy system is supplied to the power grid via this power transmission line. This is an advantage because thereby any capacity of the power transmission line which is not utilised by the wind turbine can be used by the airborne wind energy system. This allows the capacity of the power transmission line to be utilised to a greater extent, possibly increasing the total power production of the site. In addition, a more stable power production level may be obtained. Furthermore, in some circumstances, the wind turbine may be derated, i.e. the power production of the wind turbine may be deliberately reduced, and an increased power production of the airborne wind energy system may be allowed instead. This decreases the wear on the wind turbine, increasing its expected lifetime, without reducing the total power production of the site.

The airborne wind energy system comprises at least one separate generator. Accordingly, the airborne wind energy system generates electrical energy by means of the separate generator, and the electrical energy originating from the airborne wind energy system is subsequently supplied to the power transmission line in a suitable manner. Thus, the electrical energy originating from the wind turbine is generated by means of the wind turbine generator, while the electrical energy originating from the airborne wind energy system is generated by means of the separate generator, but the electrical energy originating from the wind turbine as well as the electrical energy originating from the airborne wind energy system is provided to the power grid via the power transmission line.

By providing the airborne wind energy system with a separate generator it may be achieved that the generation of electrical energy by the wind turbine and by the airborne wind energy system do not interfere with each other. In one embodiment, one of the wind turbine and the airborne wind energy system may continue production of electrical energy independent of whether the other one of the wind turbine and the airborne wind energy system has stopped production of electrical energy, e.g. due to maintenance.

The separate generator may be an airborne generator, whereby the airborne wind energy system may comprise at least one airborne generator. According to this embodiment, the separate generator of the airborne wind energy system is airborne, i.e. it is included in the part of the airborne wind energy system which is launched to a high altitude. Accordingly, the energy harvested from the wind by the airborne wind energy system is converted into electrical energy at the high altitude, and is transferred towards the ground in the form of electrical energy. An electrically conductive connection is therefore required between the airborne part of the airborne wind energy system and the wind turbine. For instance, the cable which mechanically attaches the airborne wind energy system to the wind turbine may be made from an electrically conductive material. As an alternative, a separate electrically conductive cable may be provided.

As an alternative, the airborne wind energy system may comprise at least one generator positioned at the base station, e.g. in the nacelle; i.e. the separate generator may be positioned in the nacelle. According to this embodiment, the energy harvested from the wind by the airborne wind energy system is transferred towards the ground in the form of mechanical energy and supplied to a separate generator arranged in the nacelle of the wind turbine.

As another alternative, the separate generator of the airborne wind energy system may be positioned in any other suitable position, such as in or near the tower of the wind turbine and/or in or near the foundation.

The separate generator may be coupled to a converter unit and/or a transformer of the wind turbine. According to this embodiment, the electrical energy originating from the airborne wind energy system is provided to the power transmission line via the converter and/or the transformer of the wind turbine. Thereby a separate converter unit and/or a separate transformer is not required for the airborne wind energy system. This reduces the costs of the installation.

One end of the cable of the airborne wind energy system may be mounted on the nacelle. In wind turbines, the nacelle is normally mounted on the tower via a yaw bearing, allowing the nacelle to perform yawing movements relative to the tower in order to direct the wind turbine blades into the incoming wind. When the cable of the airborne wind energy system is mounted on the nacelle, the cable, and thereby the airborne wind energy system, will be rotated along with the nacelle as it performs yawing movements. Thus, according to this embodiment, the wind turbine and the airborne wind energy system share a yawing system. Thereby it is automatically ensured that the airborne wind energy system is directed into the incoming wind.

Furthermore, when one end of the cable is mounted on the nacelle, the length of the cable required in order to position the launched part of the airborne wind energy system at a suitable altitude is reduced as compared to a situation where the cable is attached at a position at or near the ground. This reduces the weight as well as the costs of the cable, in particular in the case that the cable needs to be electrically conductive as well as mechanically durable, because such cables are heavy as well as expensive.

Finally, mounting one end of the cable on the nacelle allows improved launching conditions for the airborne wind energy system. For instance, the airborne wind energy system will be clear of the wind turbine blades faster, thereby reducing the risk of collisions between the airborne wind energy system and the wind turbine blades. Furthermore, in the case that it is necessary to stop operation of the wind turbine and/or neighbouring wind turbines during launch and/or retraction of the airborne wind energy system, the time period during which operation of the wind turbine (s) must be stopped can be reduced.

The airborne wind energy system may be mounted on the nacelle via a mounting base being rotatably connected to the nacelle. According to this embodiment, the mounting base, and thereby the airborne wind energy system, is allowed to perform small rotational movements relative to the nacelle. Thus, even though the airborne wind energy system is substantially directed into the incoming wind along with the nacelle and by means of the yawing system of the wind turbine, it may still be moved slightly away from this position by allowing the mounting base to rotate slightly relative to the nacelle. This is, e.g., an advantage in the case that the airborne wind energy system is of a kind which comprises a kite, a glider or a similar device, which follow a crosswind flight path, e.g. in 'eight' shapes, while generating electrical energy.

As an alternative, the cable may be mounted directly on the nacelle.

As another alternative, one end of the cable of the airborne wind energy system may be mounted to the foundation or the tower of the wind turbine. According to this embodiment, the airborne wind energy system does not share the yawing system of the wind turbine.

In this case, the cable may be mounted via a bearing system arranged circumferentially with respect to the tower. Thereby the airborne wind energy system is allowed to perform yawing movements with respect to the foundation or the tower of the wind turbine, in order to direct the airborne wind energy system into the incoming wind, and thereby the bearing system performs the function of a separate yawing system for the airborne wind energy system, which operates independently with respect to the yawing system of the wind turbine.

The bearing system may be arranged at some height and/or near the ground. In the case that the bearing system is arranged near the ground, it may be arranged circumferentially with respect to the foundation or with respect to the base of the tower. Alternatively, the bearing system may be arranged at some height, i.e. along the tower between the foundation and the nacelle.

In the case that the wind turbine is a multirotor wind turbine, i.e. a wind turbine comprising two or more rotors, the rotors may be mounted on arms extending away from the tower. In this case the cable may be mounted at the top of the tower, well clear of the rotors. This is very advantageous, because the risk of collisions between the airborne wind energy system and the wind turbine blades is very low.

The wind installation may comprise a control system for controlling the operation of the airborne wind energy system in dependence on the wind turbine operation. According to this embodiment the control of the wind turbine and the control of the airborne wind energy system are coordinated. For instance, this allows the capacity of the power transmission line to be utilised to a greater extent and/or the wear on the wind turbine may be reduced without reducing the total power production of the site, as described above. This will be described in further detail below.

Controlling the operation of the wind turbine and the airborne wind energy system may, e.g., include monitoring the wind direction and the yaw position of the wind turbine. In the case that the yaw position of the wind turbine differs from the wind direction, the wind turbine blades as well as the airborne wind energy system is not positioned correctly with respect to the incoming wind. If the discrepancy between the yaw position and the wind direction becomes too large, there is a risk of collision between the airborne wind energy system and the wind turbine blades of the wind turbine. Therefore, when this occurs, operation of the wind turbine may be stopped in order to avoid such collisions. This is in particular an advantage at sites where large and/or frequent changes in wind direction are expected.

According to a second aspect, the invention provides a wind energy park comprising a number of wind installations wherein at least one wind installation is a wind installation according to the first aspect of the invention. Thus, at least one of the wind turbines of the wind energy park has an airborne wind energy system mounted thereon. Thereby the infrastructure of the site of the wind energy park, including power cables, roads, service equipment, etc., is utilised to a greater extent. Furthermore, the total power production of the site may be increased, and/or a more stable power production of the site may be provided.

The wind energy park may be operated in such a manner that the total power production of the wind energy park is maintained at or close to a certain power production level. For instance, in the case that one or more of the wind turbines is stopped, e.g. due to maintenance or service, or due to malfunction, the airborne wind energy system of one or more of the other wind installations may be launched in order to compensate for the missing power production of the stopped wind turbine(s), thereby maintaining the total power production of the wind energy park.

Particularly, the cable of the airborne wind energy system may be attached to the wind turbine at an attachment point which is located remote from the blades of the wind turbine. Thereby entanglement of the cable by the rotating blade can be avoided.

According to a third aspect, the invention provides a wind installation comprising a wind turbine and an airborne wind energy system, the wind turbine comprising a tower placed on a foundation on a wind turbine site, the wind turbine further comprising at least one nacelle mounted on the tower and for each nacelle, a rotor coupled to the nacelle and being rotatable about an axis of rotation for generating electrical energy for a power grid, the wind turbine being electrically connected to the power grid via a power transmission line, the airborne wind energy system being configured to generate electrical energy and for transmitting the electrical energy via the power transmission line, the airborne wind energy system being coupled to the wind turbine via a cable, wherein the cable is attached to the wind turbine at an attachment point, the attachment point being independent of rotation of the rotor.

By attaching the airborne wind energy system at an attachment point being independent of rotation of the rotor of the wind turbine, generation of energy by the wind turbine and the airborne wind energy system may be carried out independent of each other. Furthermore, mechanical interference between movement caused by the rotor and movement caused by the airborne wind energy system can be reduced or even avoided.

The airborne wind energy system may in one embodiment be mechanically coupled to a drivetrain of the wind turbine. In the present context the term 'drivetrain' should be interpreted to include the mechanical parts which interconnect the rotor and the generator of the wind turbine. Thus, according to this embodiment, the energy which is transferred from the part of the airborne wind energy system which is launched to a high altitude is in the form of mechanical energy. This mechanical energy is provided to a suitable part of the drivetrain of the wind turbine, and is thereby supplied to the generator of the wind turbine, via the drivetrain. For instance, the airborne wind energy system may be mechanically coupled to a main shaft or a hub of the wind turbine.

It should be noted that a person skilled in the art would readily recognise that any feature described in combination with the first aspect of the invention could also be combined with the second or third aspects of the invention, that any feature described in combination with the second aspect of the invention could also be combined with the first or third aspects of the invention, and that any feature described in combination with the third aspect of the invention could also be combined with the first or second aspects of the invention.

In one embodiment, the wind installation may comprise a control structure configured to control movement of the part of the airborne wind energy system which can be launched to a higher altitude. It should be understood, that this control structure may form part of any of the above described aspects.

It should further be understood, that the below described control system for controlling the operation of the airborne wind energy system in dependence on the wind turbine operation and the control structure for controlling movement of the airborne wind energy system may be two separate systems. However, in one embodiment, the one of the control structure and the control system may be a subsystem of the other one of the control structure and the control system. The control structure and the control system may further be integrated in the same computer system. The control structure and the control system may be operated independent of each other.

The control structure may be configured to execute a predetermined movement pattern effecting rotational movement of the airborne wind energy system, i.e. a 360 degrees movement about the rotor axis. The rotational movement may be uniform meaning that is identical to the previous rotation or it may be non-uniform; i.e. that each rotation may follow another path than the previous rotation. The rotation may e.g. circular, oval, wave-shaped, etc., while still forming a rotational movement.

The rotor of the wind turbine may define a rotational plane; i.e. the plane in which the blades rotate. The rotational plane may define a substantially cone shaped flow area extending axially along the axis of rotation, where the outer periphery of the cone shaped flow area is defined by the wind turbine blade tips such that the radial size of the flow area is at least the same as the length of the blades. The movement of the airborne wind energy system may be controlled so that the rotational movement is outside the flow area.

The movement may be controlled so that the distance from the outer periphery of the cone shaped flow area to the airborne wind energy system is less than 10 percent of the radius of the cone shaped flow area. By this control, the energy production by the airborne wind energy system may be increased due to specific flow conditions caused by the blades.

In one embodiment, the rotational movement may be substantially circular.

Furthermore, the control structure may be configured to control the rotational movement synchronous with rotation of the rotor, whereby the airborne wind energy system may follow the movement of the blades.

According to a fourth aspect, the invention provides a method for controlling the operation of a wind installation comprising a wind turbine and an airborne wind energy system, the wind turbine comprising a tower placed on a foundation, the wind turbine further comprising at least one nacelle mounted on the tower, and for each nacelle, a rotor coupled to the nacelle, the rotor being connected to a generator for converting energy of the rotating rotor into electrical energy for a power grid, the wind turbine being electrically connected to the power grid via a transmission line, the airborne wind energy system comprising a separate generator for generating electrical energy, the method comprising controlling the operation of the airborne wind energy system in dependence on operation of the wind turbine.

It should be noted that a person skilled in the art would readily recognise that any feature described in combination with the first aspect of the invention could also be combined with the second or third or fourth aspects of the invention, that any feature described in combination with the second aspect of the invention could also be combined with the first or third or fourth aspects of the invention, that any feature described in combination with the third aspect of the invention could also be combined with the first or second or fourth aspects of the invention, and that any feature described in combination with the fourth aspect of the invention could also be combined with the first or second or third aspects of the invention.

The method according to the fourth aspect of the invention is a method for controlling the operation of a wind installation of the kind comprising a wind turbine and an airborne wind energy system. Thus, the wind installation may be a wind installation according to the first or third aspects of the invention. The remarks set forth above are therefore equally applicable here.

According to the method of the fourth aspect of the invention the operation of the airborne wind energy system is controlled in dependence on the wind turbine operation. Thereby the operation of the airborne wind energy system can be controlled in a manner which allows the potential capacity of the power transmission line connecting the wind turbine to the power grid to be fully utilised, or at least to be utilised to a greater extent, in particular under circumstances where the power production of the wind turbine is below the nominal power production. Furthermore, the operation of the airborne wind energy system may be controlled in order to provide a more stable total power supply from the wind turbine and the airborne wind energy system to the power grid.

It should be noted that the power production of the wind turbine as well as the power production of the airborne wind energy system may be controllable.

Thereby a given total power output from the system can be obtained with various distributions of power production originating from the wind turbine and from the airborne wind energy system, respectively. This provides a very flexible system, in which the power production of the wind turbine and the power production of the airborne wind energy system can each be selected in a manner which fulfils other objects, as long as a desired total power production is obtained.

For instance, at low wind speeds, where the power production of the wind turbine is below rated power, the airborne wind energy system may be controlled to obtain a maximum power production from the airborne wind energy system, in order to increase the total power production. As the power production of the wind turbine approaches the rated power, the power production of the airborne wind energy system may be gradually decreased in order to ensure that the total power production does not exceed a level corresponding to the rated power of the wind turbine.

Alternatively or additionally, the wind turbine may be deliberately derated and the power production of the airborne wind energy system increased in situations where the loads on the wind turbine would otherwise be relatively high. Thereby wear on the wind turbine is reduced, and the lifetime of the wind turbine may be increased. This is, e.g., relevant at wind speeds near the rated wind speed, where loads on pitch systems are often very high.

Similarly, there may be situations where operation of the airborne wind energy system might result in a risk of causing damage or excessive loads on the airborne wind energy system, but where the wind turbine may operate without such risks. In this case, the airborne wind energy system may be derated or stopped, while the wind turbine is operated normally.

Alternatively or additionally, the total power production may simply be increased above the rated power of the wind turbine by launching the airborne wind energy system. However, this requires that the power transmission line connecting the wind turbine to the power grid is designed for handling this increased power level.

The power production of the wind turbine could, e.g., be controlled by controlling a pitch angle of the wind turbine blades or by controlling a rotational speed via a converter.

The airborne wind energy system may be launched when the power production of the wind turbine is below a rated power for the wind turbine. According to this embodiment, when the power production of the wind turbine is below the rated power, or the nominal power level, it can be assumed that the capacity of the power transmission line connecting the wind turbine to the power grid is not fully utilised. Furthermore, the power level supplied to the power grid is below the rated, or nominal, power level.

Therefore, when this occurs, the airborne wind energy system is launched, thereby causing the airborne wind energy system to produce electrical energy and supply this to the power grid, via the power transmission line. Thereby the total power production of the wind turbine and the airborne wind energy system is increased, e.g. sufficiently to reach the nominal power production level of the wind turbine. Thereby the potential capacity of the power transmission line is utilised fully, or almost fully, and a substantially constant power supply to the power grid is ensured.

Alternatively or additionally, the airborne wind energy system may be launched at wind speeds below a certain upper wind speed threshold. In this case the upper wind speed threshold may be selected as a wind speed at which the power production of the wind turbine reaches the rated, or nominal, power production level.

Similarly, the airborne wind energy system may be retracted when the power production of the wind turbine reaches a rated power for the wind turbine. Under these circumstances it can be expected that the power production of the wind turbine is sufficient to fully utilise the capacity of the power transmission line, and additional power production from the airborne wind energy system is therefore not required.

Alternatively or additionally, the airborne wind energy system may be retracted at wind speeds above a predefined wind speed upper threshold. In this case the predefined wind speed upper threshold may be a wind speed at which the power production of the wind turbine reaches the rated power production level.

Operation of the wind turbine may be stopped during launch and/or retraction of the airborne wind energy system. When operation of the wind turbine is stopped, the rotor carrying the wind turbine blades stops rotating. Thereby the risk of the cable of the airborne wind energy system colliding with the wind turbine blades during launch and/or retraction of the airborne wind energy system is minimised. The wind turbine may, e.g., be stopped with the rotor in an optimal position, in the sense that the wind turbine blades are moved to a position where the risk of collisions between the airborne wind energy system and the wind turbine blades is minimised. For instance, in the case that the wind turbine comprises three wind turbine blades, the rotor may be stopped in a position where one of the wind turbine blades points in a downwards direction with the remaining two wind turbine blades extending upwards along an inclined direction. This leaves a region between the two upwardly extending wind turbine blades where the airborne wind energy system can be launched or retracted without colliding with the wind turbine blades.

BRIEF DESCRIPTION OF THE DRAWINGS

The invention will now be described in further detail with reference to the accompanying drawings in which.

DETAILED DESCRIPTION OF THE DRAWINGS

Figure 1:
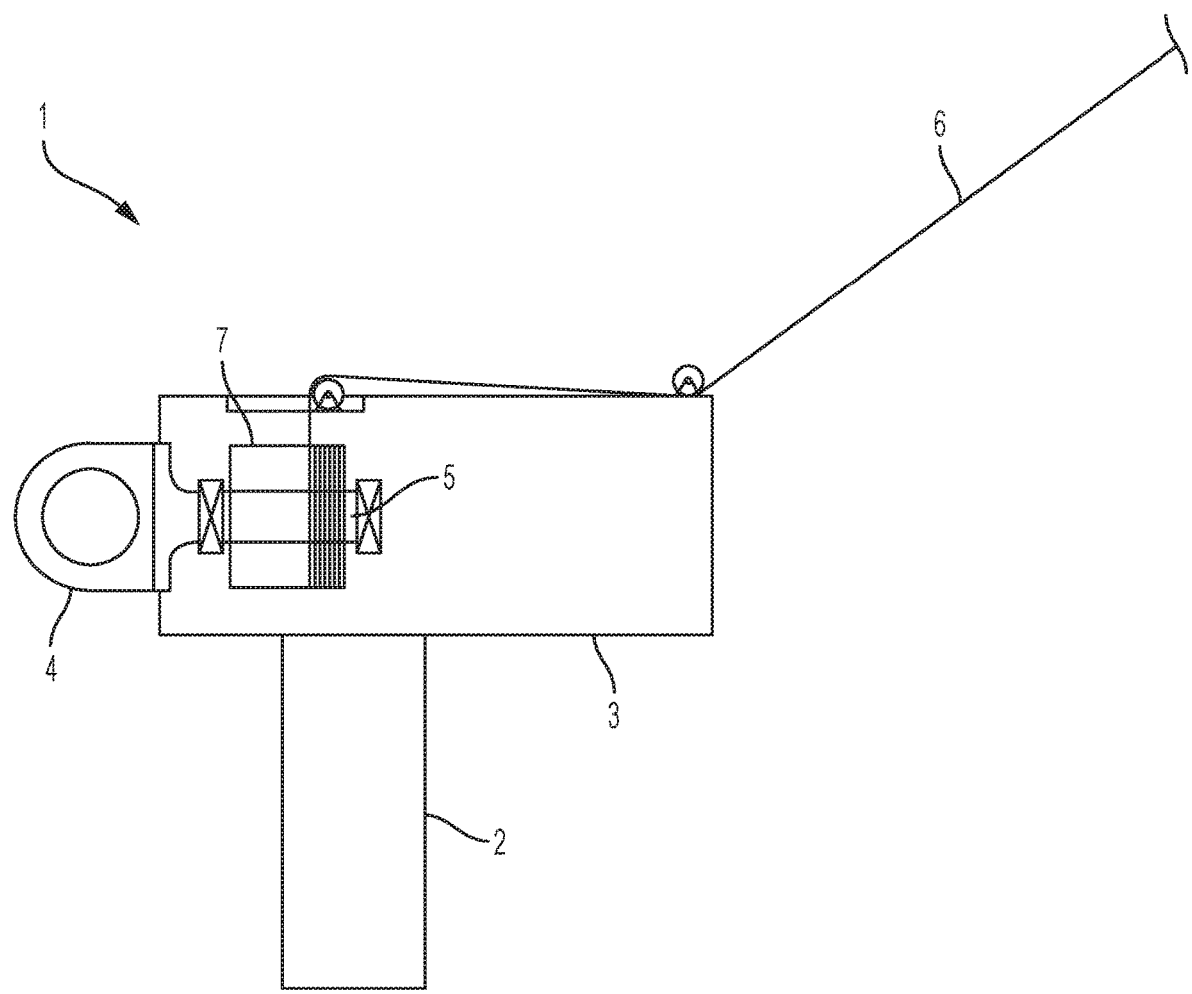
FIGS. 1-3 illustrate wind installations according to three embodiments of the invention.

FIG. 1 illustrates a wind turbine 1 according to an embodiment of the invention. The wind turbine 1 comprises a tower 2 and a nacelle 3 mounted on the tower 2. A rotor 4 is coupled to the nacelle 3 in a manner which allows the rotor 4 to rotate relative to the nacelle 3 when wind is acting on wind turbine blades (not shown) mounted on the rotor 4.

The rotor 4 is connected to a main shaft 5, and rotating movements of the rotor 4 are thereby transferred to the main shaft 5. The main shaft 5 is, in turn, coupled to a generator (not shown) via a gear system (not shown). Thereby rotating movements of the main shaft 5 are transformed into electrical energy by means of the generator.

An airborne wind energy system (not shown) is coupled to the wind turbine 1 via a cable 6. The cable 6 is mechanically coupled to the main shaft 5 by the cable 6 being wound around an element 7 being arranged around the main shaft 5. Thereby extracting or retrieving the cable 6 causes the element 7 to rotate. This rotation can be transferred to the main shaft 5, thereby increasing the rotational speed of the main shaft 5 and accordingly increasing the energy production of the generator. This allows the capacity of a power transmission line connecting the generator to a power grid to be utilised to a greater extent, in particular in the case that the energy production of the wind turbine 1 is low, e.g. due to low wind speeds.

The cable 6 may be extracted and retrieved by means of movements of the airborne wind energy system, which could in this case be in the form of a kite. This will be described in further detail below. The energy generated by the airborne wind energy system is, according to this embodiment, transferred to the wind turbine 1 in the form of mechanical energy.

Figure 2:
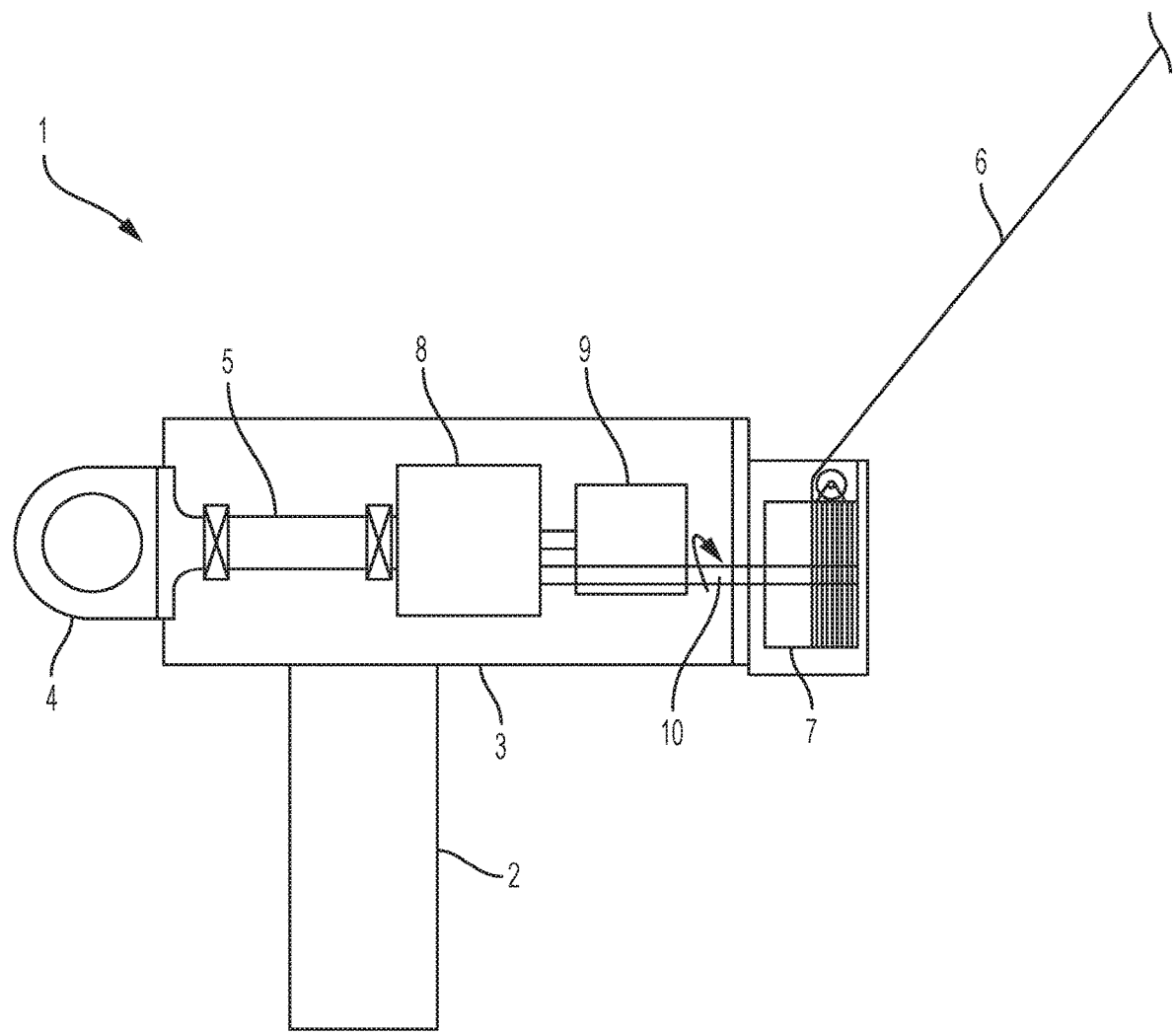

FIG. 2 illustrates a wind turbine 1 according to an embodiment of the invention. The wind turbine 1 is similar to the wind turbine 1 of FIG. 1, and it will therefore not be described in detail here. In FIG. 2 the gear system 8 and the generator 9 of the wind turbine 1 are shown.

In the embodiment of FIG. 2, the cable 6 is wound around an element 7 which is coupled to the gear system 8 via a rotating shaft 10. Thereby rotational movements of the element 7, caused by extracting or retrieving the cable 6, are transferred to the gear system 8, thereby increasing the rotational speed of the input shaft of the generator 9. Accordingly, the energy production of the generator 9 is increased, similar to the situation described above with reference to FIG. 1. Accordingly, in the embodiment of FIG. 2 the energy generated by the airborne wind energy system is also transferred to the wind turbine 1 in the form of mechanical energy.

Figure 3:
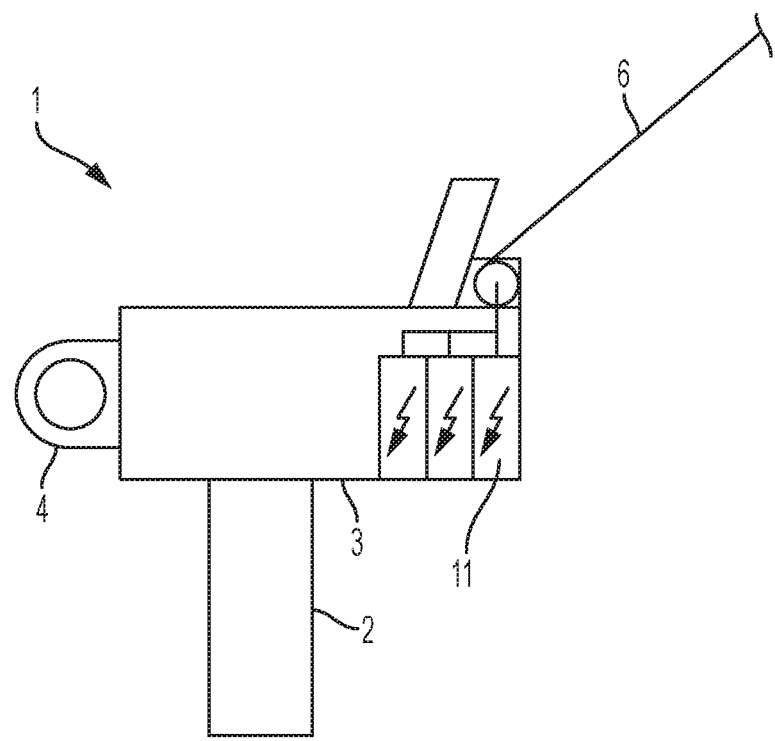

FIG. 3 illustrates a wind turbine 1 according to an embodiment of the invention. The wind turbine 1 is similar to the wind turbines 1 of FIGS. 1 and 2, and it will therefore not be described in detail here.

In the embodiment of FIG. 3 the cable 6 is electrically connected to a transformer 11 of the wind turbine 1. The transformer 11 is also connected to the generator (not shown) of the wind turbine 1. Thus, the energy generated by the airborne wind energy system is transferred to the wind turbine 1 in the form of electrical energy, and the cable 6 therefore needs to be electrically conducting.

Thus, also in this embodiment, the capacity of the power transmission line connecting the wind turbine 1 to the power grid can be utilised to a greater extent.

Figure 4:
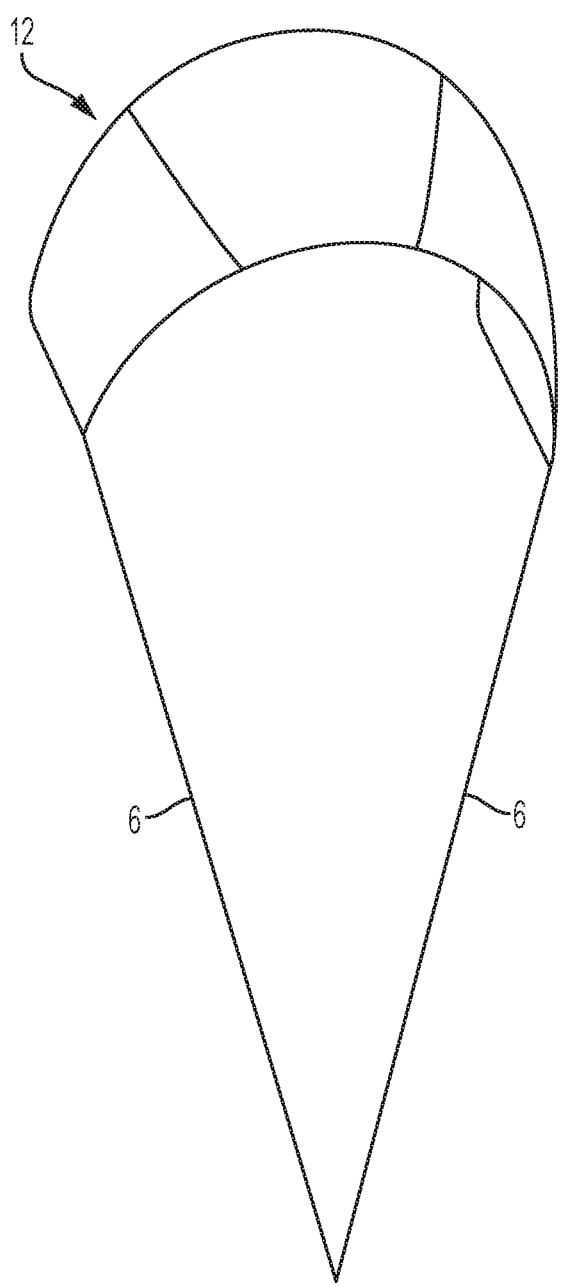
FIGS. 4 and 5 are perspective views of two airborne wind energy systems for use in a wind installation according to an embodiment of the invention.

FIG. 4 is a perspective view of an airborne wind energy system in the form of a kite 12, for use in a wind installation according to an embodiment of the invention. The kite 12 catches the wind and is thereby moved. This causes a cable 6 attached to the kite 12 to be extracted or retrieved, thereby generating mechanical energy. This mechanical energy is transferred to a wind turbine in a suitable manner. For instance, the mechanical energy may be transferred to the drivetrain of the wind turbine, e.g. to a main shaft of to a gear system as described above with reference to FIGS. 1 and 2. Alternatively, the mechanical energy may be transferred to a separate generator, which is in turn electrically coupled to an electrical component of the wind turbine, e.g. to a transformer, as described above with reference to FIG. 3, or to a converter unit.

Figure 5:
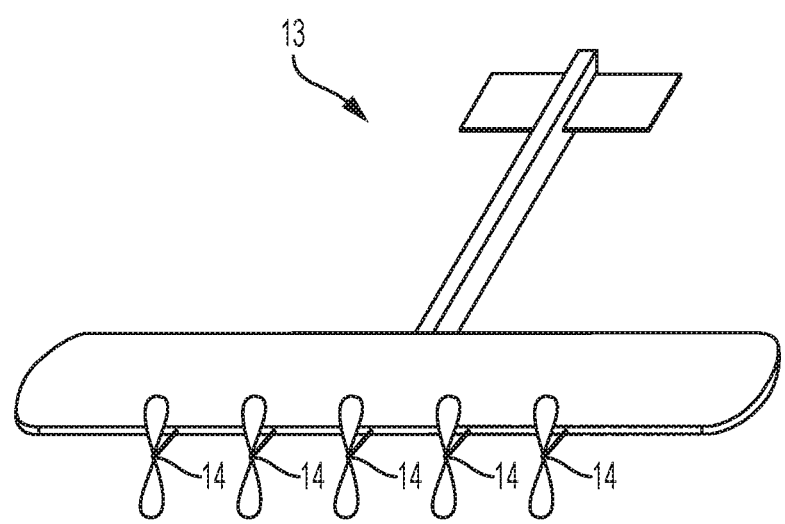

FIG. 5 is a perspective view of an alternative airborne wind energy system in the form of a glider 13, also sometimes referred to as a Makani, for use in a wind installation according to an embodiment of the invention. The glider 13 is provided with five rotors 14, each being capable of extracting energy from the wind and generating electrical energy. The generated electrical energy is transferred to a wind turbine by means of an electrically conducting cable (not shown), e.g. in the manner described above with reference to FIG. 3.

Figure 6:
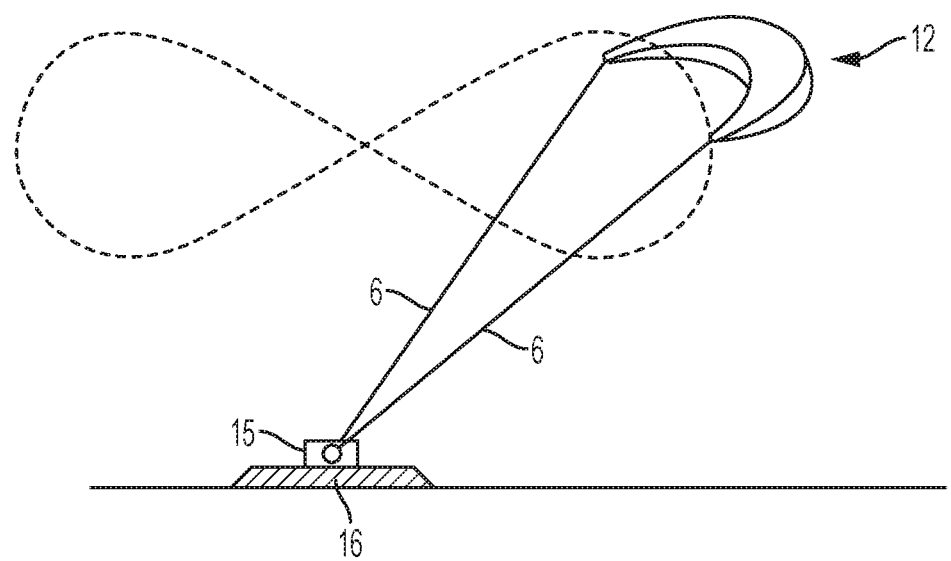
FIGS. 6-9 illustrate wind installations according to four embodiments of the invention.

FIG. 6 illustrates operation of the kite 12 of FIG. 4. It can be seen that the wind acts on the kite 12 and causes it to move along a movement pattern. For instance, the kite 12 may be extracted along a substantially linear path and subsequently retracted while moving along a movement pattern having the shape of the figure eight, as indicated by the dotted line. During the linear movement of the kite 12, mechanical energy may be transferred to an element arranged at the attachment point 15, thereby causing electrical energy to be generated, e.g. in the manner described above with reference to FIGS. 1-3. During the subsequent retraction of the kite 12, energy may be consumed. However, the energy consumed is expected to be less than the energy being generated during the linear movement of the kite 12.

It should be noted that, even though FIG. 6 shows the kite 12 being connected directly to a foundation 16, it might alternatively be connected to a wind turbine, e.g. in the manner illustrated in any of FIGS. 1-3.

Figure 7:
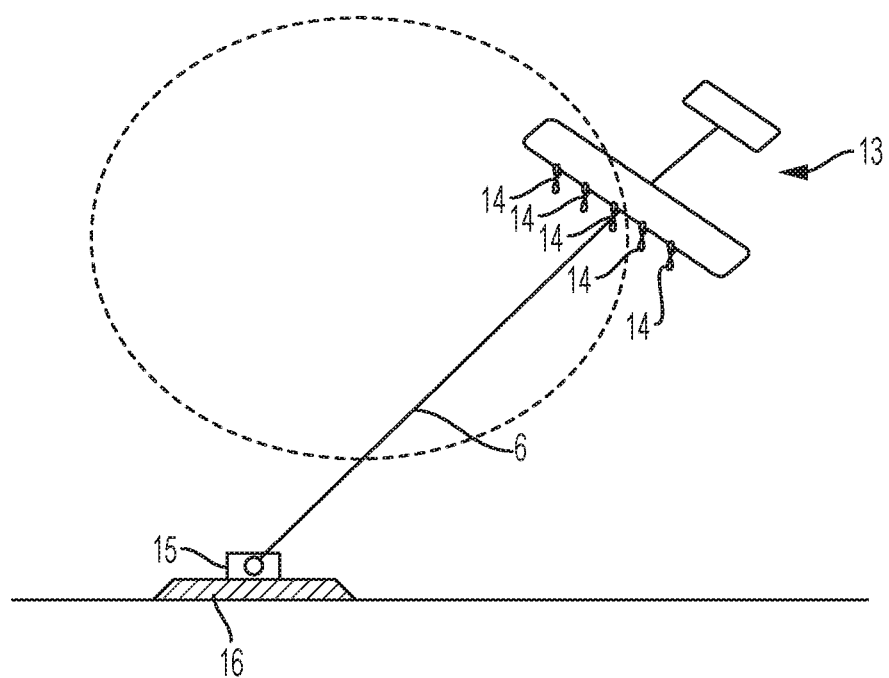

FIG. 7 illustrates operation of the glider 13 of FIG. 5. It can be seen that the wind acts on the glider 13 and causes it to move along a substantially circular movement pattern, as indicated by the dotted line. This movement of the glider 13 causes rotation of the rotors 14, and thereby electrical energy is generated.

The electrical energy is transferred to a suitable electrical component, e.g. a transformer or a converter unit, arranged at the attachment point 15, via electrically conductive cable 6.

It should be noted that, even though FIG. 7 shows the glider 13 being connected directly to a foundation 16, it might alternatively be connected to a wind turbine, e.g. in the manner illustrated in any of FIGS. 1-3.

Figure 8:
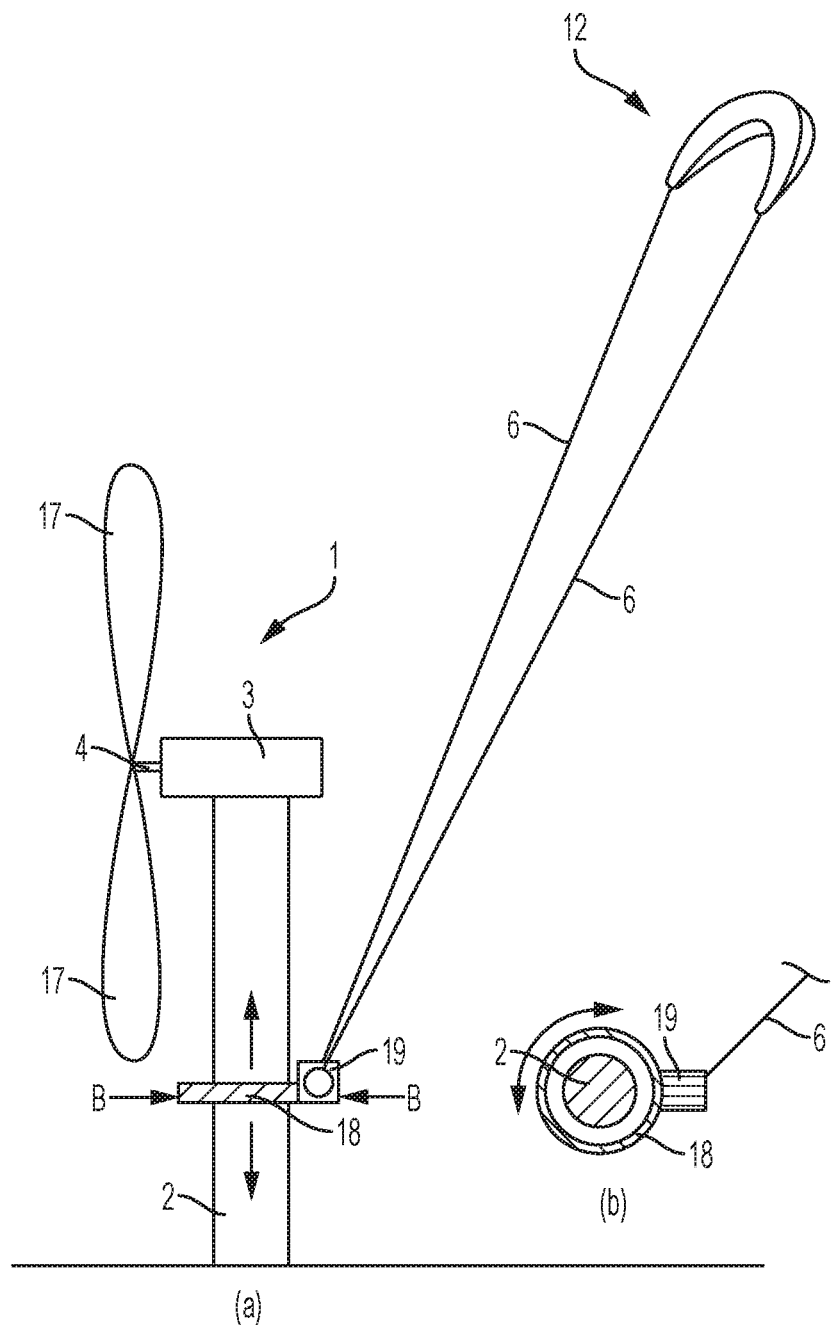

FIG. 8 illustrates a wind installation according to an embodiment of the invention. FIG. 8a is a side view of the wind turbine 1 and FIG. 8b is a cross sectional view of the wind turbine 1 along the line B-B. The wind turbine 1 comprises a tower 2, a nacelle 3 mounted on the tower 2 and a rotor 4, carrying a set of wind turbine blades 17, coupled rotatably to the nacelle 3.

An airborne wind energy system in the form of a kite 12 is coupled to the tower 2 of the wind turbine 1 via cables 6 and via a bearing system 18 arranged circumferentially with respect to the tower 2. The allows the attachment point 19 between the cables 6 and the bearing system 18 to be rotated about the centre axis of the tower 2, thereby positioning the kite 12 relative to the wind turbine 1 in accordance with the direction of the wind. Accordingly, the bearing system 18 provides a separate yawing system for the airborne wind energy system, which operates independently of the yawing system of the wind turbine 1.

Figure 9:
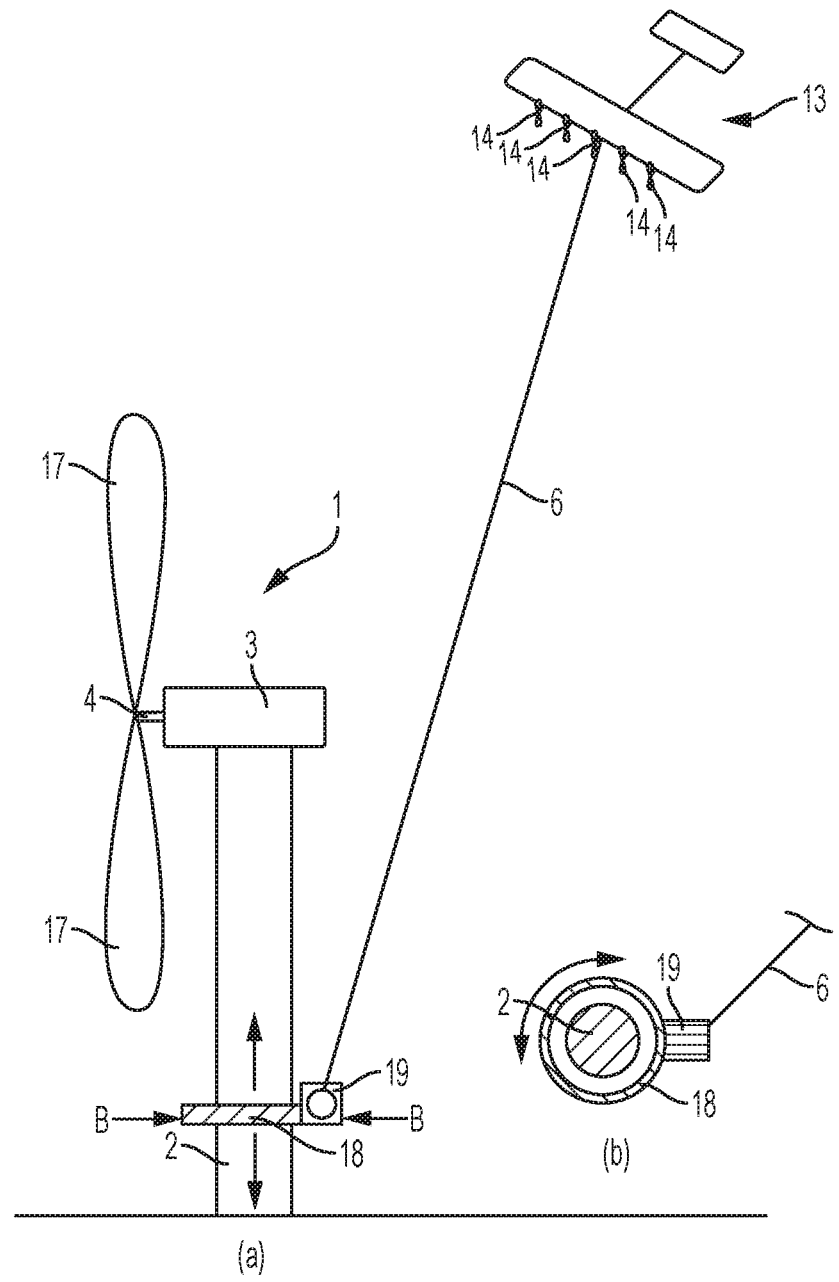

FIG. 9 illustrates a wind installation according to an embodiment of the invention. FIG. 9a is a side view of the wind turbine 1 and FIG. 9b is a cross sectional view of the wind turbine 1 along the line B-B. The wind turbine 1 of FIG. 9 is very similar to the wind turbine of FIG. 8, and it will therefore not be described in detail here. However, in the embodiment of FIG. 9 the airborne wind energy system is in the form of a glider 13, and the cable 6 is electrically conductive.

Figure 10:
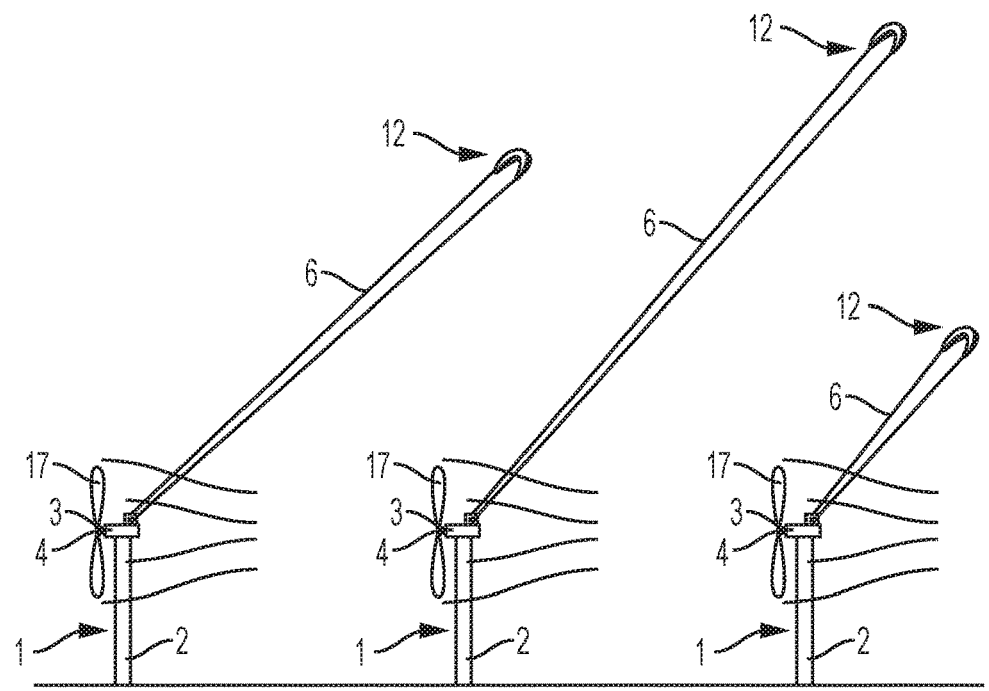
FIGS. 10 and 11 illustrate operation of wind installations according to embodiments of the invention.

FIG. 10 illustrates operation of wind installations according to an embodiment of the invention. Three wind turbines 1 are shown in FIG. 10, each comprising a tower 2, a nacelle 3 and a rotor 4 carrying a set of wind turbine blades 17. Each wind installation further comprises an airborne wind energy system in the form of a kite 12 coupled to the nacelle 3. Thereby the kites 12 rotate along with the respective nacelles 3 as these perform yawing movements relative to the respective towers 2, in order to direct the wind turbine blades 17 into the incoming wind. Thereby it is ensured that the kites 12 are launched in a direction pointing away from the wind turbine blades 17 of the wind turbine 1 onto which they are coupled. This reduces the risk of collisions between the cables 6 and the wind turbine blades 17.

Furthermore, the kites 12 are launched in such a manner that they are arranged above neighbouring wind turbines 1, thereby reducing the risk of collisions between the kites 12 and neighbouring wind turbines 1.

It can be seen that the kites 12 are launched to an altitude which is well above the wake created by the wind turbines 1. Furthermore, the wind speeds prevailing at this altitude are expected to be generally higher than the wind speeds prevailing at the altitude of the rotors 4 of the wind turbines 1. This provides a good utilisation of the available wind at the site of the wind turbines 1, and the total energy production of the site can thereby be increased as compared to a situation where airborne wind energy systems are not coupled to the wind turbines 1.

The kites 12 are able to move along specified movement paths, e.g. as described above with reference to FIG. 6. Thereby mechanical energy is generated and transferred to the respective wind turbines 1. Here the mechanical energy may be transferred to the drive trains of the wind turbines 1, e.g. as described above with reference to FIGS. 1 and 2. Alternatively, the mechanical energy may be supplied to a separate generator arranged in the nacelle 3, and the electrical energy generated by the separate generator may be supplied to a suitable electrical component of the wind turbine 1, such as a transformer or a converter unit, e.g. in the manner described above with reference to FIG. 3.

Figure 11:
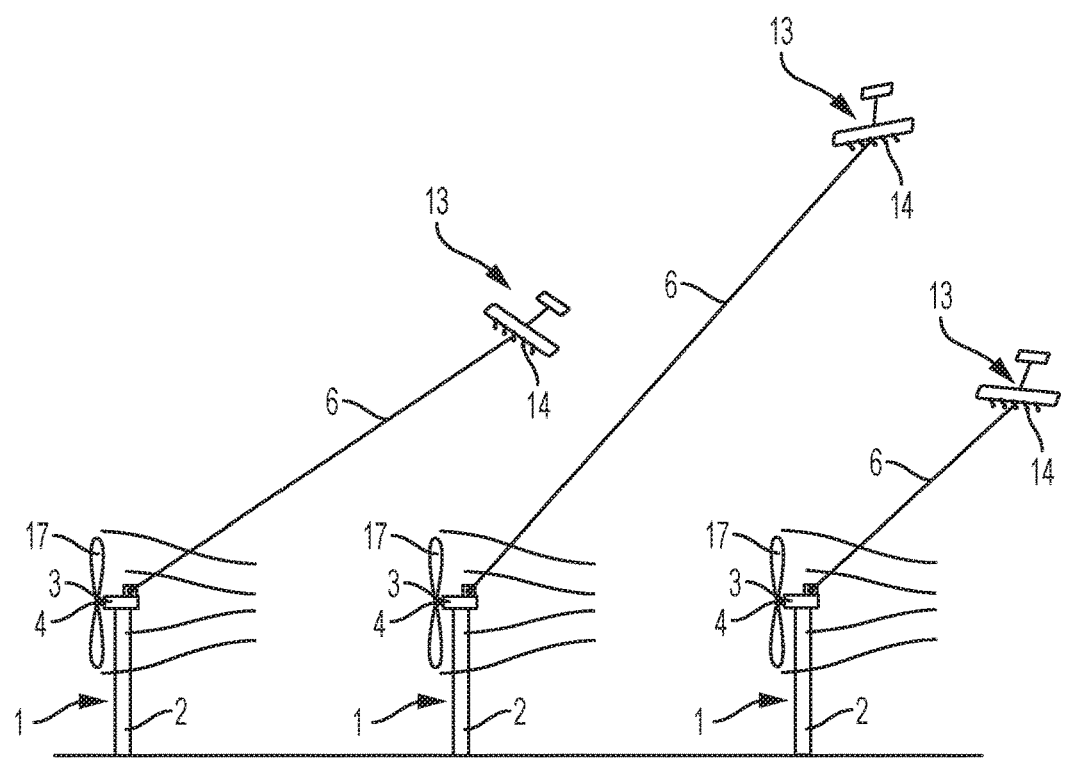

FIG. 11 illustrates operation of wind installations according to an embodiment of the invention. The wind turbines 1 of FIG. 11 are very similar to the wind turbines of FIG. 10, and they will therefore not be described in further detail here.

However, in the wind installations of FIG. 11 the airborne wind energy systems are in the form of gliders 13. The gliders 13 are able to move along specified movement paths, e.g. as described above with reference to FIG. 7. Thereby the rotors 14 of the gliders 13 generate electrical energy, and the generated electrical energy is transferred to the respective nacelles 3 via electrically conducting cables 6. Here the electrical energy is supplied to a suitable electrical component of the wind turbine 1, such as a transformer or a converter unit, e.g. in the manner described above with reference to FIG. 3.

Figure 12:
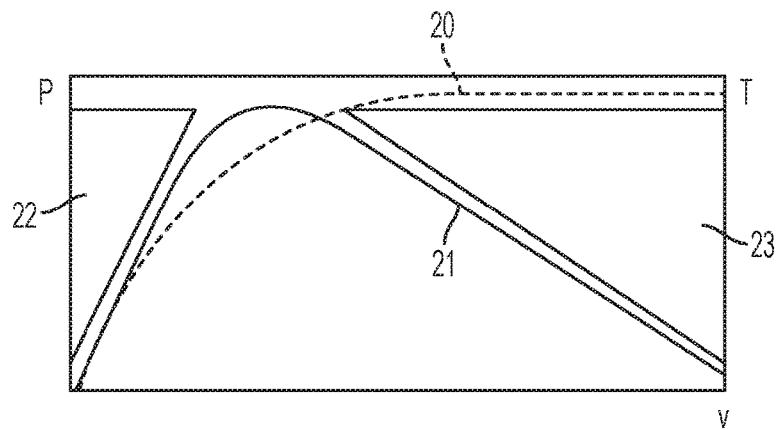
FIG. 12 is a graph illustrating power output and thrust relating to a wind installation according to an embodiment of the invention.

FIG. 12 is a graph illustrating power output and thrust relating to a wind installation according to an embodiment of the invention. The dashed line 20 represents power output (P) from the wind turbine as a function of wind speed (v). The solid line 21 represents thrust (T) on the wind turbine as a function of wind speed (v). At wind speeds within zone 22 it is possible to increase the total power output from the wind installation without increasing costs or mechanical wear on the wind turbine, by coupling an airborne wind energy system to the wind turbine. At wind speeds within zone 23 it is also possible to increase the total power output from the wind installation by coupling an airborne wind energy system to the wind turbine. However, in this case the costs of the electrical parts of the wind turbine are increased. In zone 23 the wind turbine and/or the airborne wind energy system may be derated in order to limit the total power production to a certain maximum level. For instance, the wind turbine may be derated while the power production of the airborne wind energy system is increased, in order to decrease the loads on the wind turbine.

Figure 13:
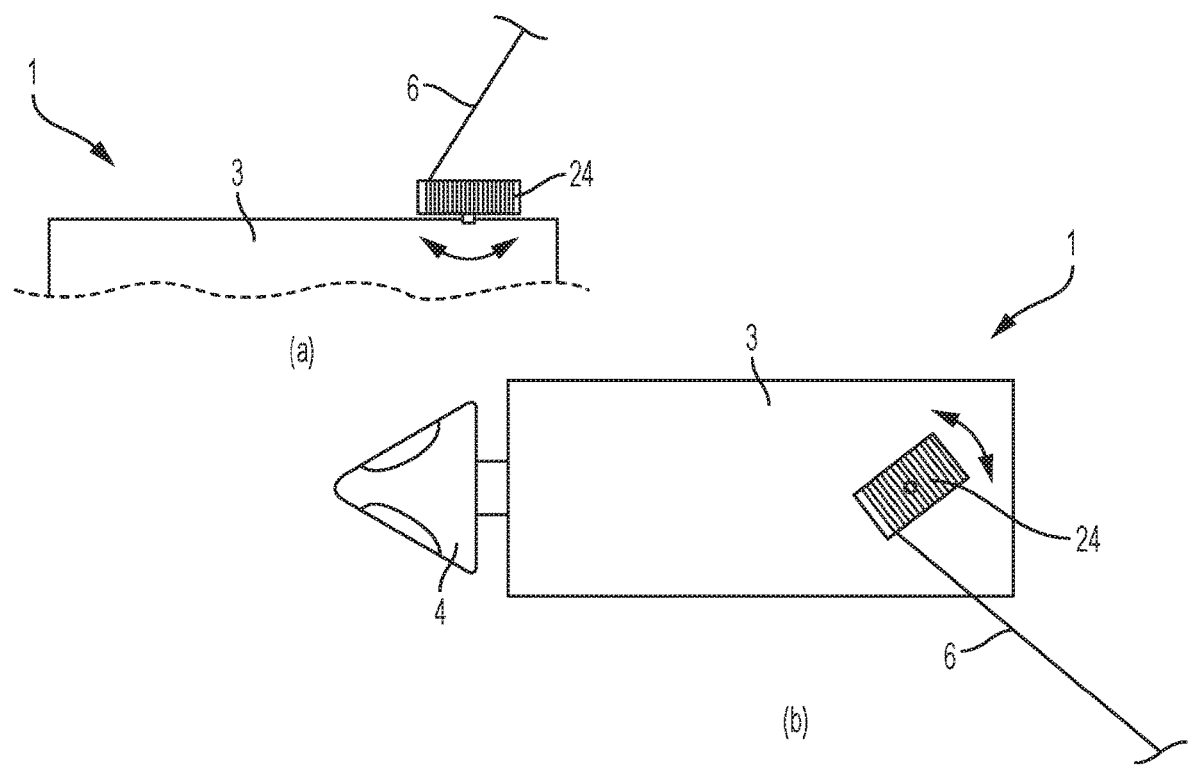
FIG. 13 illustrates mounting of an airborne wind energy system on a wind turbine according to an embodiment of the invention.

FIG. 13 illustrates mounting of an airborne wind energy system on a wind turbine 1 according to an embodiment of the invention. FIG. 13a is a side view of the wind turbine 1 and FIG. 13b is a top view of the wind turbine 1. The airborne wind energy system is mounted on the nacelle 3 of the wind turbine 1, via a cable 6. Thereby the airborne wind energy system is in general rotated along with the nacelle 3 as it performs yawing movements. However, the cable 6 is attached to a mounting base 24 being rotatably connected to the nacelle 3. Accordingly, the attachment point of the cable 6 is allowed to rotate slightly relative to the nacelle 3. This may, e.g., be required when the airborne wind energy system moves along a movement pattern, e.g. as described above with reference to FIGS. 6 and 7.

Figure 14:
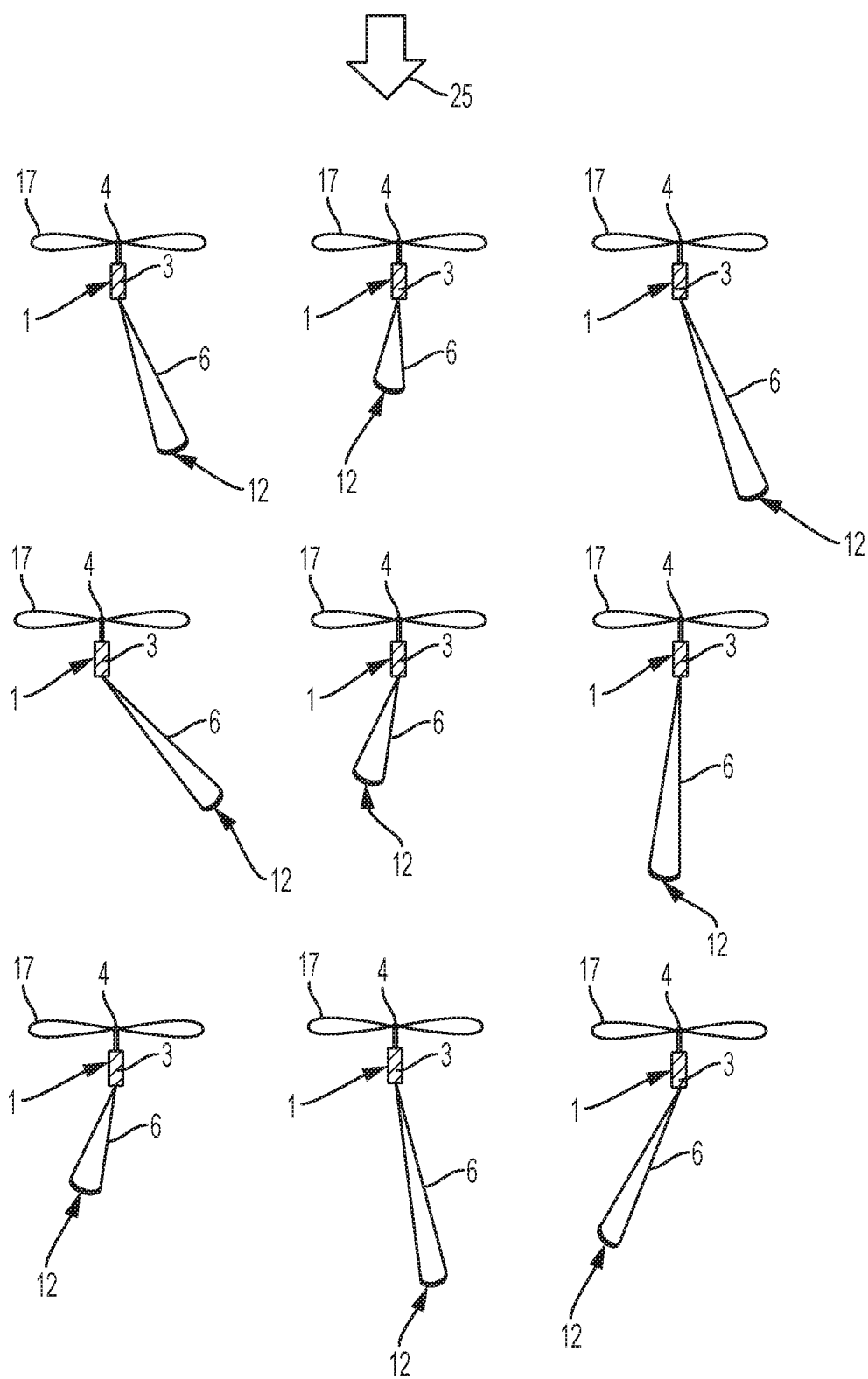
FIGS. 14 and 15 illustrate wind energy parks according to two embodiments of the invention.

FIG. 14 shows a wind energy park according to an embodiment of the invention. Thus, the wind energy park comprises a number of wind installations, nine of which are shown from above. Each wind installation comprises a wind turbine and an airborne wind energy system in the form of a kite 12 attached to the nacelle 3 of the wind turbine 1 by means of a cable 6. The direction of the incoming wind is indicated by arrow 25. It can be seen that the nacelles 3 of the wind turbines 1 have all been yawed to a position where the rotors 4 are directed towards the incoming wind 25. It can also be seen that all of the kites 12 are launched in a direction away from the respective wind turbines 1 along the direction of the incoming wind 25. It can also be seen that the kites 12 are in different positions along their movement patterns. Thus, the kites 12 need not to operate in a synchronous manner.

Figure 15:
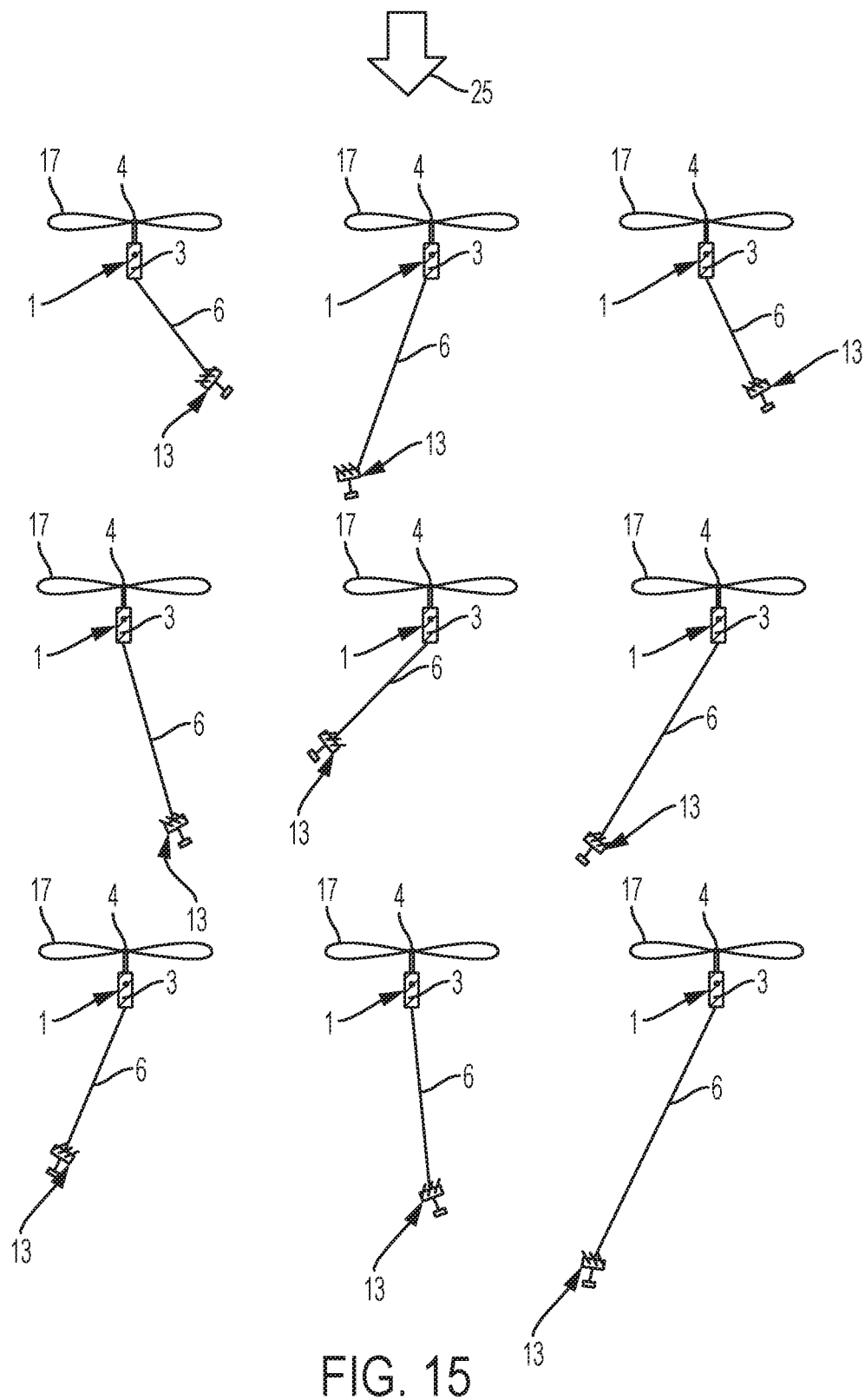

FIG. 15 shows a wind energy park according to an embodiment of the invention. The wind energy park of FIG. 15 is very similar to the wind energy park of FIG. 14, and it will therefore not be described in detail here. However, in the wind energy park of FIG. 15 the airborne wind energy systems are in the form of gliders 13.

Figure 16:
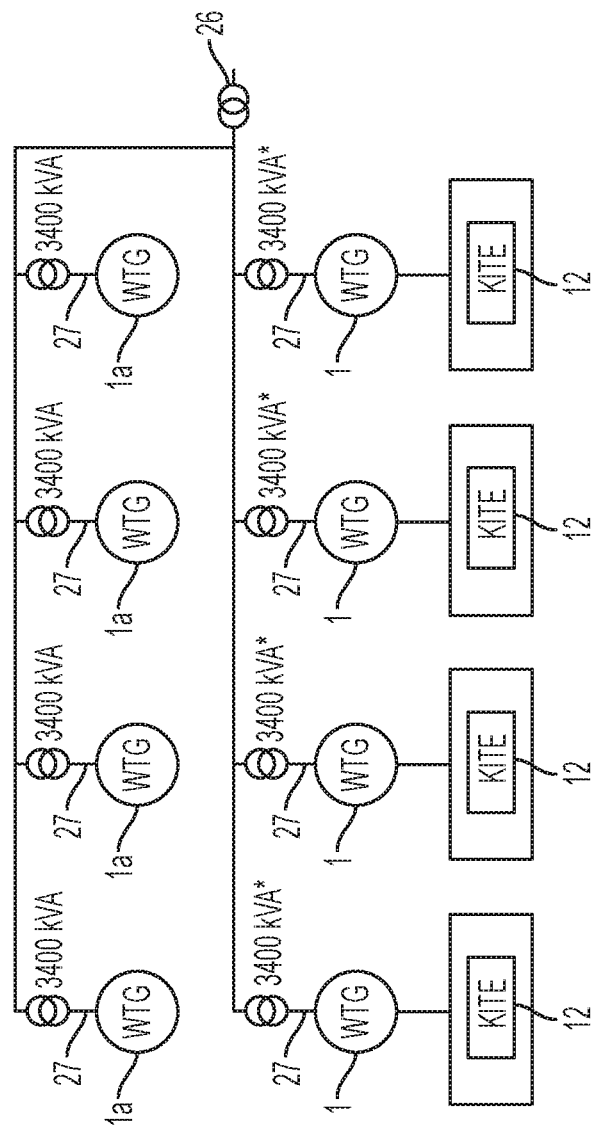
FIG. 16 illustrates electrical connection of wind installations according to an embodiment of the invention to a power grid.

FIG. 16 illustrates electrical connection of wind installations according to an embodiment of the invention to a power grid. FIG. 16 shows four wind installations according to an embodiment of the invention, each comprising a wind turbine 1 and an airborne wind energy system in the form of a kite 12. The wind turbines 1 are arranged in a wind energy park, which also comprises a number of wind turbines 1a, four of which are shown, without an airborne wind energy system coupled hereto.

The wind turbines 1, 1a are all connected to a substation 26 via respective power transmission lines 27. The maximum capacity of each power transmission line is 3400 kVa. Under some wind conditions, the wind turbines 1, 1a are not capable of maintaining an energy production which utilises the maximum capacity of their power transmission lines 27. Under these circumstances the wind installations may launch their kites 12, thereby increasing the total energy production of the wind installation. Thereby the capacities of the power transmission lines 27 are utilised to a greater extent, and the total energy production of the wind energy park is increased.

It should be noted that the airborne wind energy system of one or more of the wind installations could be in the form of a glider instead of in the form of a kite.

FIG. 17 illustrates operation of a wind turbine and an airborne wind energy system according to six embodiments of the invention. The graphs show power production as a function of wind speed. The solid lines 28 represent power production of a wind turbine, and the dashed lines 29 represent total power production of the wind turbine and an airborne wind energy system. The area 30 between the curves 28, 29 represents the contribution to the total power production provided by the airborne wind energy system.

Figure 17A:
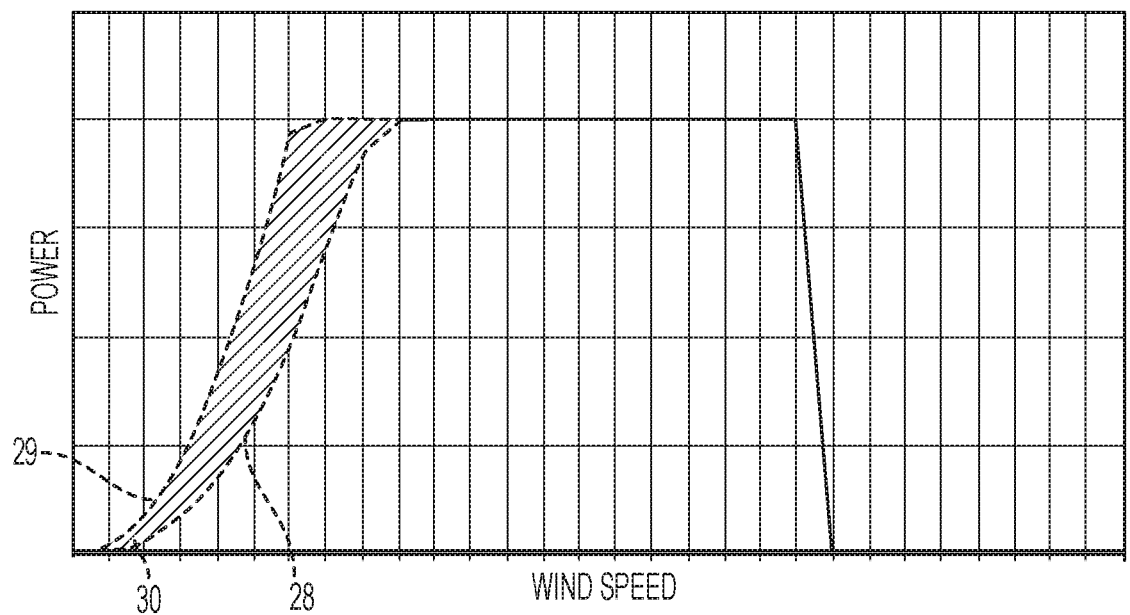
FIG. 17 illustrates operation of a wind turbine and an airborne wind energy system according to six embodiments of the invention.

FIG. 17a illustrates a situation where an airborne wind energy system in the form of a kite is mounted on the wind turbine. The airborne wind energy system is launched at low wind speeds, where the power production of the wind turbine is below rated power. Accordingly, the total power production is increased at these wind speeds. However, when the power production of the wind turbine reaches rated power, the airborne wind energy system is retracted, and the total power production corresponds to the power production of the wind turbine. It can be seen from FIG. 17a that the kite is able to produce power at wind speeds which are below the cut-in wind speed for the wind turbine.

Figure 17B:
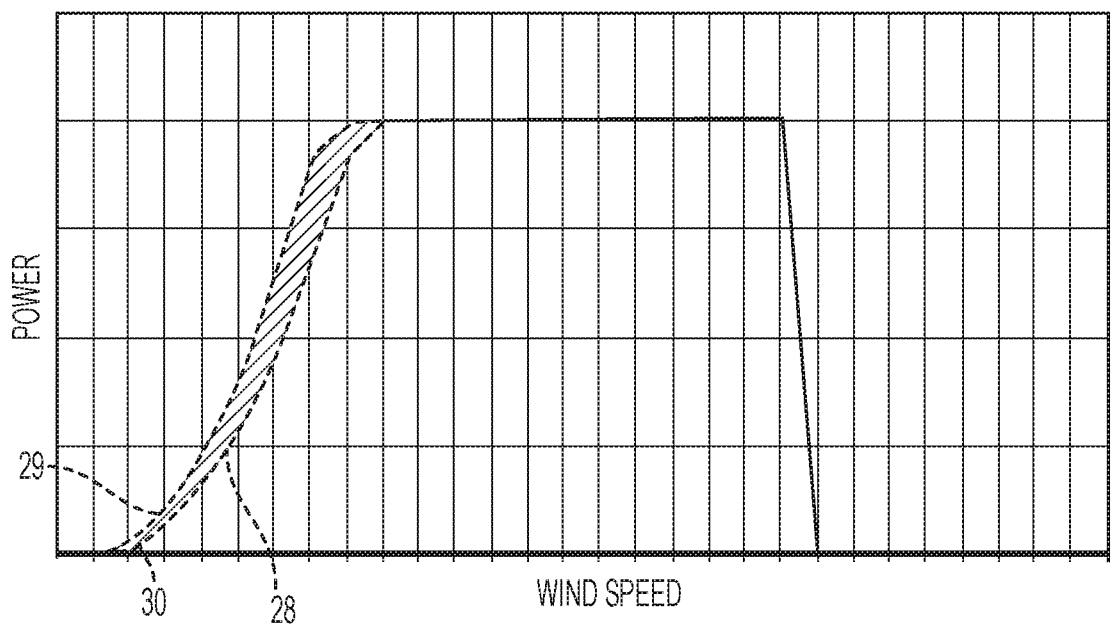

FIG. 17b illustrates a situation similar to the situation illustrated by FIG. 17a. However, in FIG. 17b the airborne wind energy system is in the form of a glider. It can be seen from FIG. 17b that contribution to the total power production provided by the glider is somewhat lower than the contribution provided by the kite of FIG. 17a. Furthermore, the cut-in wind speed of the glider is substantially identical to the cut-in wind speed of the wind turbine.

Figure 17C:
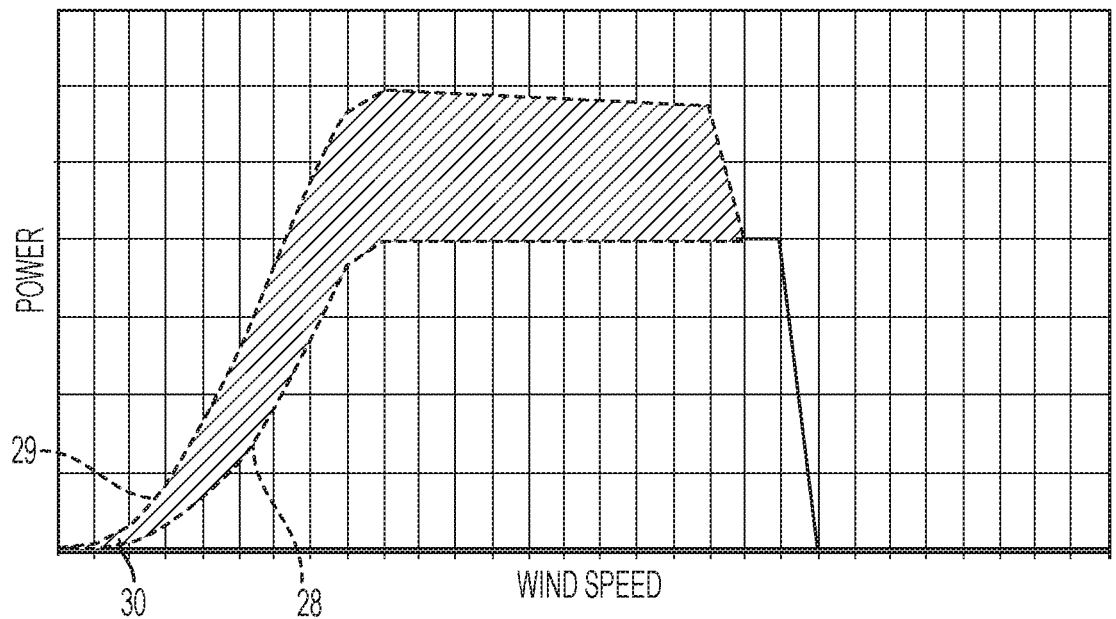

FIG. 17c illustrates a situation where the airborne wind energy system is in the form of a kite, similar to the situation illustrated in FIG. 17a. The operation at low wind speeds is essentially as described above with reference to FIG. 17a. However, in this case, when the power production of the wind turbine reaches rated power, the airborne wind energy system remains in the launched state, and thereby the airborne wind energy system continues to contribute to the total power production, until a cut-out wind speed for the airborne wind energy system is reached. Thus, in the situation illustrated in FIG. 17c, the total power production exceeds the rated power of the wind turbine within a large wind speed range. This requires that the power transmission line connecting the wind turbine to the power grid is designed to handle this increased power production.

Figure 17D:
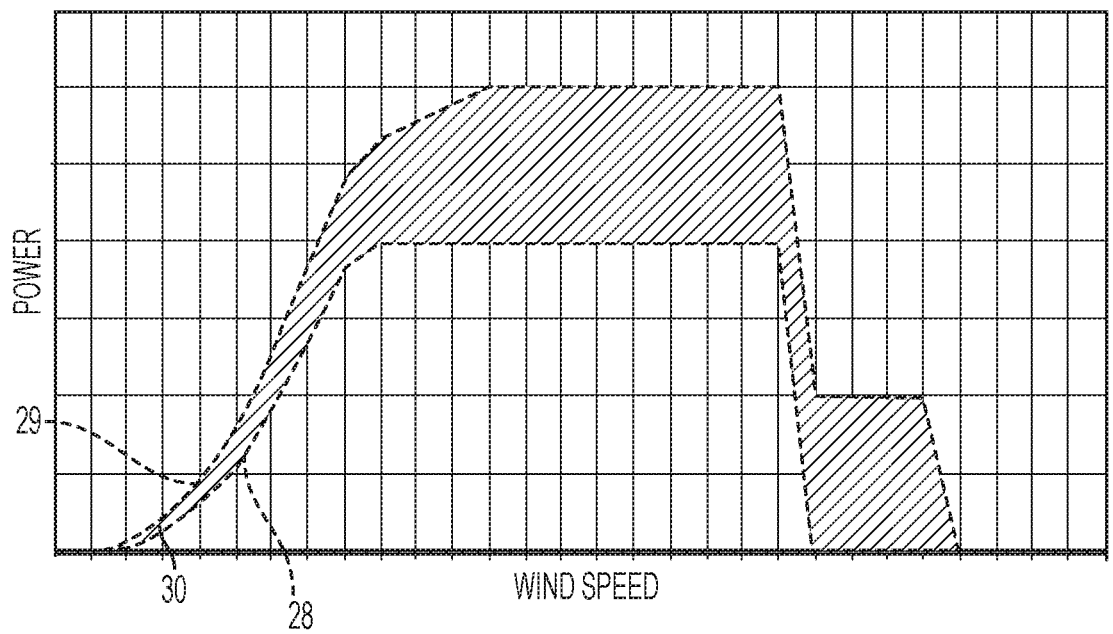

FIG. 17d illustrates a situation similar to the situation illustrated in FIG. 17c. However, in this case the airborne wind energy system is in the form of a glider. It can be seen that the glider is able to continue producing power at wind speeds above the cut-out wind speed of the wind turbine. This increases the wind speed range in which power is produced by the system.

Figure 17E:
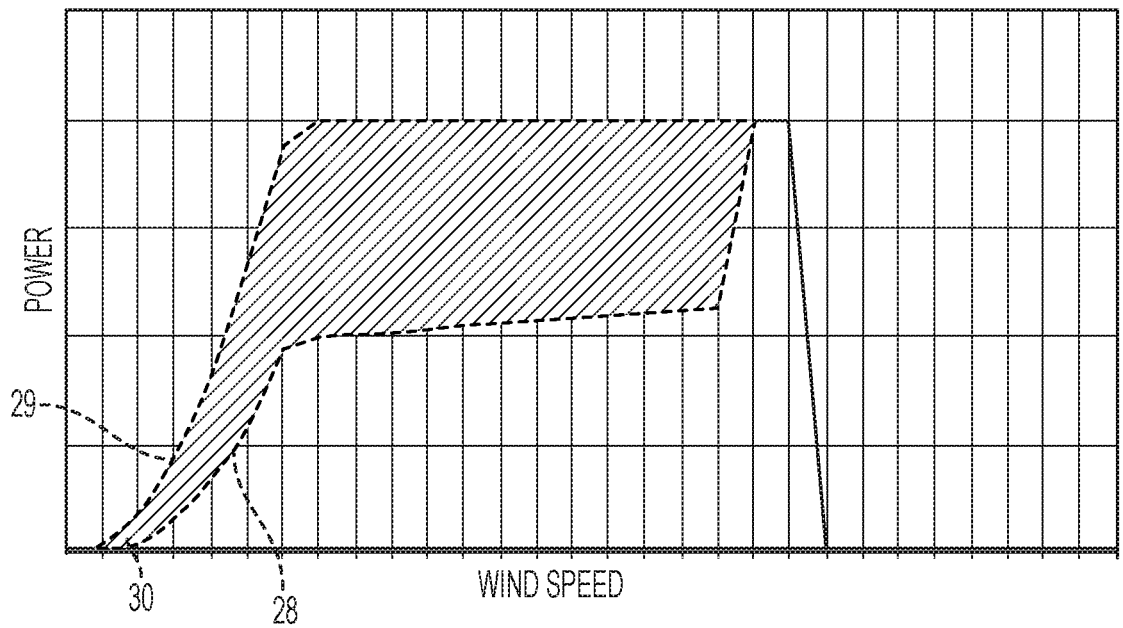

FIG. 17e illustrates a situation where the airborne wind energy system is in the form of a kite, similar to the situations illustrated in FIGS. 17a and 17c. The operation at low wind speeds is essentially as described above with reference to FIG. 17a. However, in this case, when the wind speed approaches the wind speed at which the wind turbine is able to produce rated power, the wind turbine is derated, i.e. it is deliberately operated to provide a power production which is lower than the rated power. Instead, the airborne wind energy system remains launched, and it is controlled in such a manner that the total power production of the wind turbine and the airborne wind energy system corresponds to the rated power of the wind turbine. This continues until the cut-out wind speed of the airborne wind energy system is reached, where the airborne wind energy system is retracted and the wind turbine is controlled to produce the rated power. Thus, in this case the total power production does not exceed the rated power of the wind turbine at any time, but the loads on the wind turbine are reduced because a substantial part of the total power production is provided by the airborne wind energy system within a large wind speed range.

Figure 17F:
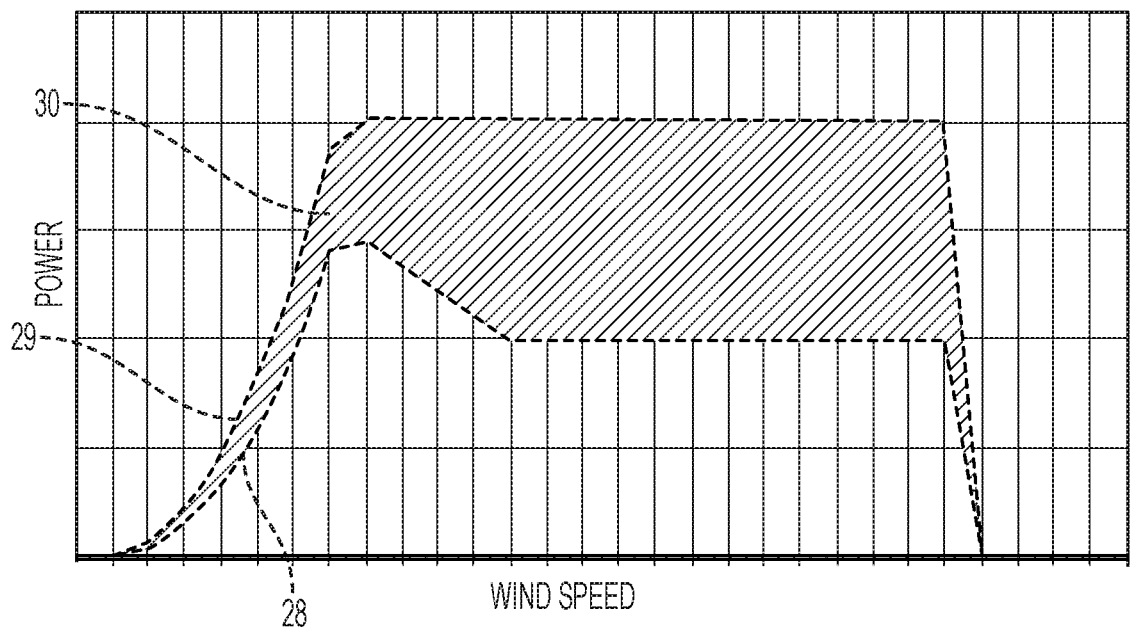

FIG. 17f illustrates a situation similar to the situation illustrated in FIG. 17e. However, in this case the airborne wind energy system is in the form of a glider. As described above with reference to FIG. 17d, it can be seen that the glider is able to produce power at high wind speeds, and therefore the wind turbine remains derated until the cut-out wind speed for the wind turbine is reached.

Figure 18:
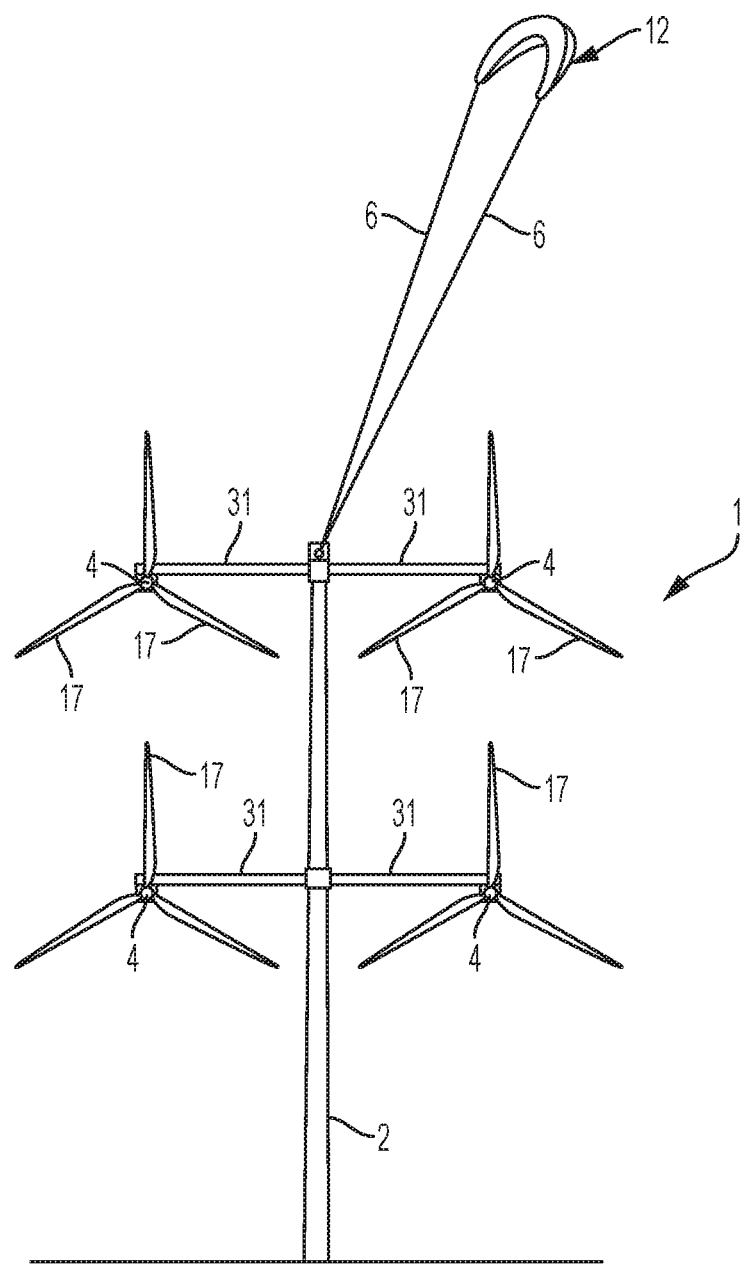
FIGS. 18 and 19 illustrate wind installations comprising multirotor wind turbines according to two embodiments of the invention.

FIG. 18 illustrates a wind installation according to an embodiment of the invention. The wind turbine 1 comprises four rotors 4, each mounted on an arm 31 mounted on the tower 2. Thus, the wind turbine 1 of FIG. 18 is a multirotor wind turbine.

An airborne wind energy system in the form of a kite 12 is mounted on the wind turbine 1 at the top of the tower 2, by means of a cable 6. Since the rotors 4 are mounted on the arms 31, at a distance from the tower 2, the wind turbine blades 17 are well clear of the mounting position of the kite 12. Accordingly, the risk of collisions between the wind turbine blades 17 and the kite 12 or the cable 6 is very low. Thus, the wind turbine 1 of FIG. 18 is very suitable for having an airborne wind energy system mounted thereon.

The total power production of the wind installation comprises contributions from each of the rotors 4 and from the kite 12. A given power production level can be reached by appropriately controlling the power production of each of these components 4, 12. For instance, one of the rotors 4 may be completely stopped while the kite 12 produces maximum power.

It should be noted that, even though the wind turbine 1 of FIG. 18 comprises four rotors 4, a multirotor wind turbine having a different number of rotors would also fall within the scope of protection of the present invention. In particular, a multirotor wind turbine having two rotors 4 arranged substantially at the same vertical level would be very suitable.

Figure 19:
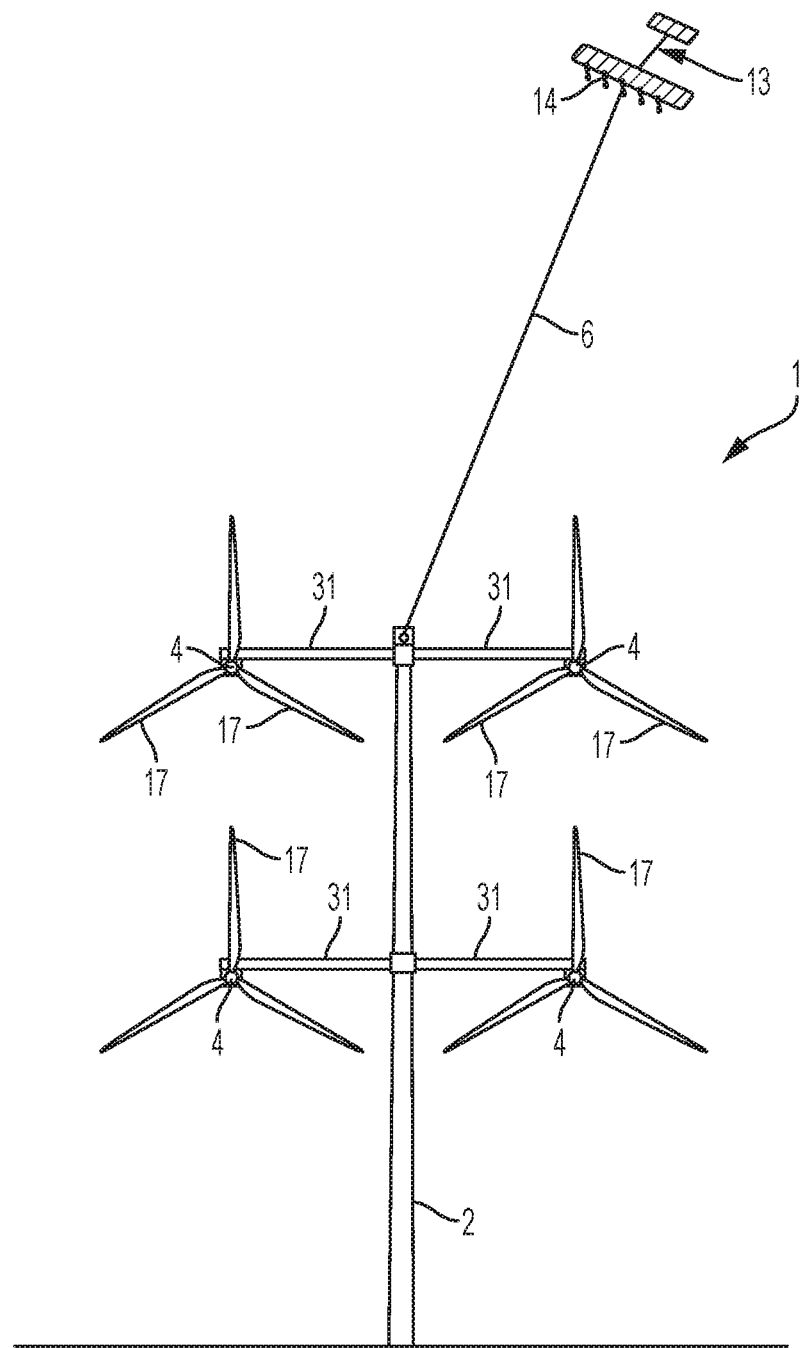

FIG. 19 illustrates a wind installation according to an embodiment of the invention. The wind turbine 1 of FIG. 19 is very similar to the wind turbine 1 of FIG. 18, and it will therefore not be described in detail here. However, in the wind turbine 1 of FIG. 19, the airborne wind energy system is in the form of a glider 13.

Figure 20:
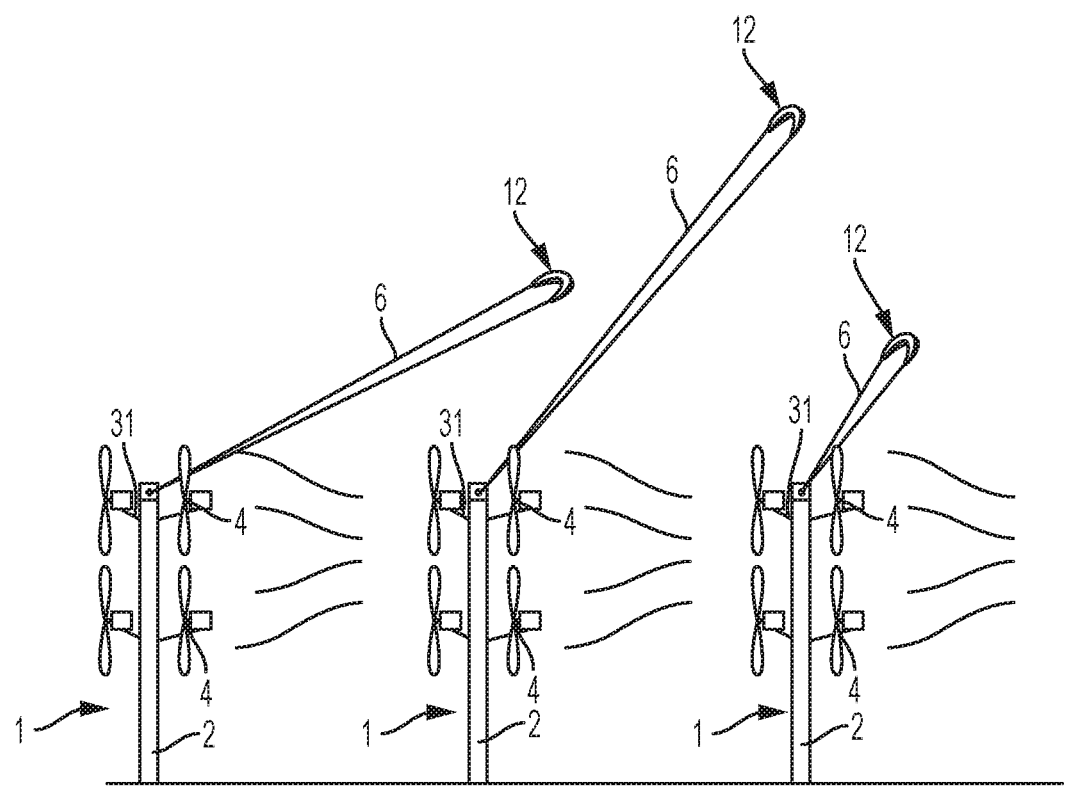
FIGS. 20 and 21 illustrate operation of wind installations comprising multirotor wind turbines according to embodiments of the invention.

FIG. 20 illustrates operation of wind installations according to an embodiment of the invention. FIG. 20 is very similar to FIG. 10, and it will therefore not be described in detail here. However, in FIG. 20 the wind turbines 1 are of the kind illustrated in FIG. 18.

Figure 21:
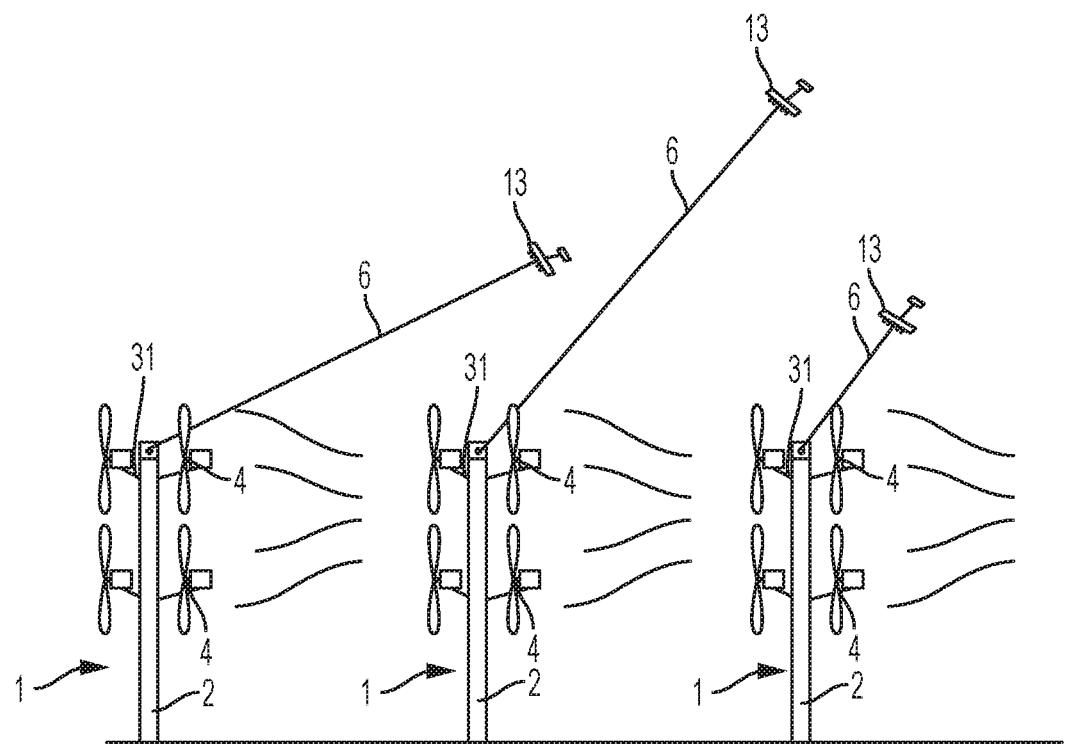

FIG. 21 illustrates operation of wind installations according to an embodiment of the invention. FIG. 21 is very similar to FIG. 11, and it will therefore not be described in detail here. However, in FIG. 21 the wind turbines 1 are of the kind illustrated in FIG. 19.

Figure 22:
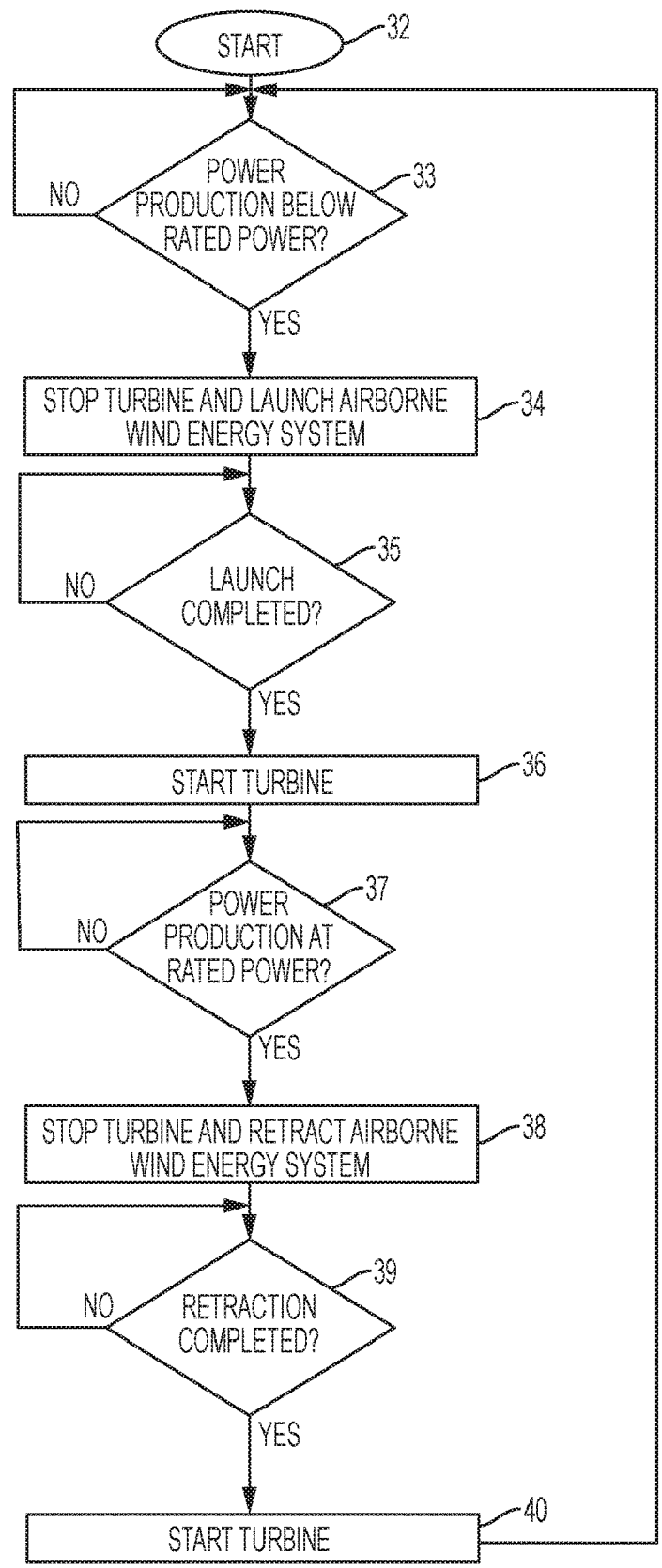
FIG. 22 is a flow chart illustrating a method for controlling the operation of a wind installation according to an embodiment of the invention.

FIG. 22 is a flow chart illustrating a method for controlling a wind installation according to an embodiment of the invention. The process is started at step 32. At step 33 it is investigated whether or not the power production of the wind turbine is below the rated power for the wind turbine. If this is not the case, normal operation of the wind turbine is continued, and the process is returned to step 33 for continued monitoring of the power production of the wind turbine.

In the case that step 33 reveals that the power production of the wind turbine is below the rated power for the wind turbine, this is an indication that the capacity of a power transmission line connecting the wind turbine to a power grid is not utilised fully. Therefore the process is forwarded to step 34, where an airborne wind energy system coupled to the wind turbine is launched. Prior to initiating the launch of the airborne wind energy system the operation of the wind turbine is stopped in order to avoid collisions between the launching airborne wind energy system and moving wind turbine blades of the wind turbine.

At step 35 it is investigated whether or not the launch of the airborne wind energy system has been completed. If this is not yet the case, operation of the wind turbine remains stopped and the process is returned to step 35 for continued monitoring of the launching process.

In the case that step 35 reveals that the launch of the airborne wind energy system has been completed, it is considered safe to restart operation of the wind turbine. The process is therefore forwarded to step 36, where the wind turbine is started. Accordingly, the total power production of the wind installation includes the power production of the wind turbine itself as well as the power production of the airborne wind energy system. Accordingly, the total power production of the wind installation is increased, and the capacity of the power transmission line can be utilised to a greater extent.

At step 37 it is investigated whether or not the power production of the wind installation has reached the rated power for the wind turbine. If this is not the case, operation of the wind turbine as well as operation of the airborne wind energy system is continued, and the process is returned to step 37 for continued monitoring of the power production of the wind installation.

In the case that step 37 reveals that the power production of the wind installation has reached the rated power for the wind turbine, it may be assumed that the power production of the wind turbine itself is now sufficient to fully utilise the capacity of the power transmission line. The additional power production provided by the airborne wind energy system is therefore no longer required. Accordingly, the process is forwarded to step 38, where retraction of the airborne wind energy system is initiated. During the retraction of the airborne wind energy system, operation of the wind turbine is stopped in order to avoid collisions between the airborne wind energy system and rotating wind turbine blades of the wind turbine.

At step 39 it is investigated whether or not the retraction of the airborne wind energy system has been completed. If this is not yet the case, operation of the wind turbine remains stopped and the process is returned to step 39 for continued monitoring of the retraction process.

In the case that step 39 reveals that the retraction of the airborne wind energy system has been completed, the process is forwarded to step 40, where operation of the wind turbine is started.

Finally, the process is returned to step 32 in order to monitor the power production of the wind turbine.

Figure 23:
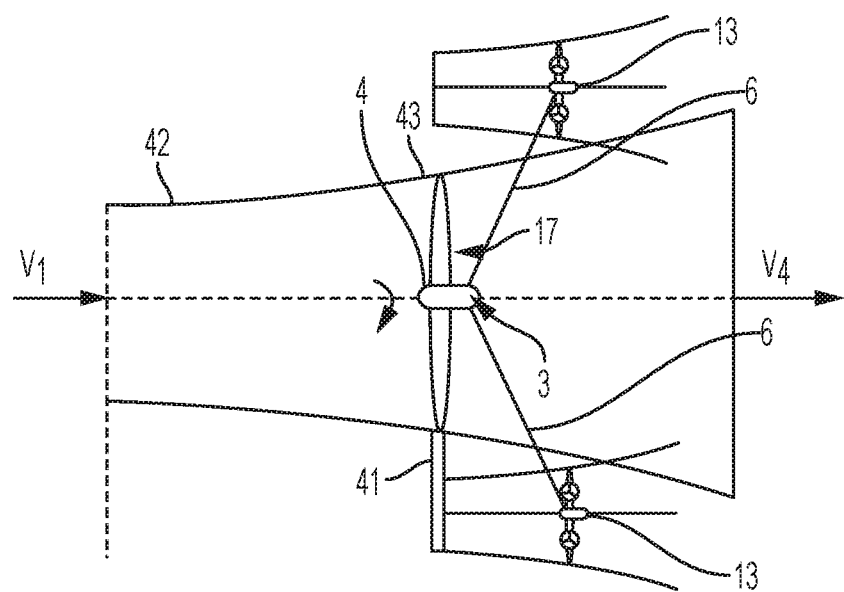
FIG. 23 illustrates a wind installation according to an embodiment of the invention.

FIG. 23 illustrates a wind installation according to an embodiment of the invention. The wind installation comprises a wind turbine 1 and an airborne wind energy system 13. The wind turbine 1 comprises a tower 2 and a nacelle 3 mounted on the tower 2. A rotor 4 is coupled to the nacelle 3 in a manner which allows the rotor 4 to rotate relative to the nacelle 3 when wind is acting on wind turbine blades 17 mounted on the rotor 4. The airborne wind energy system 13 is coupled to the wind turbine 1 via a cable 6.

The wind installation comprises a control structure (not shown) which is configured to control movement of the part of the airborne wind energy system 13 which is launched to a higher altitude.

The control structure is configured to execute a predetermined movement pattern effecting rotational movement of the airborne wind energy system 13, i.e. a 360 degrees movement about the axis of rotation.

The rotor 4 defines a rotational plane 41; i.e. the plane in which the blades 17 rotate. The rotational plane 41 defines a substantially cone shaped flow area 42 axially along the axis of rotation, where the outer periphery of the cone shaped flow area is defined by the wind turbine blade tips 43. The movement of the airborne wind energy system 13 is controlled so that the rotational movement is outside flow area 42. Thereby the energy production of the airborne wind energy system 13 can be increased due to specific flow conditions caused by the blades 17. This is schematically illustrated by V1 and V4, where V1 is the air velocity in front of the blades 17 and V4 is the air velocity behind the blades 17, where V4 is larger than V1.

Figure 24:
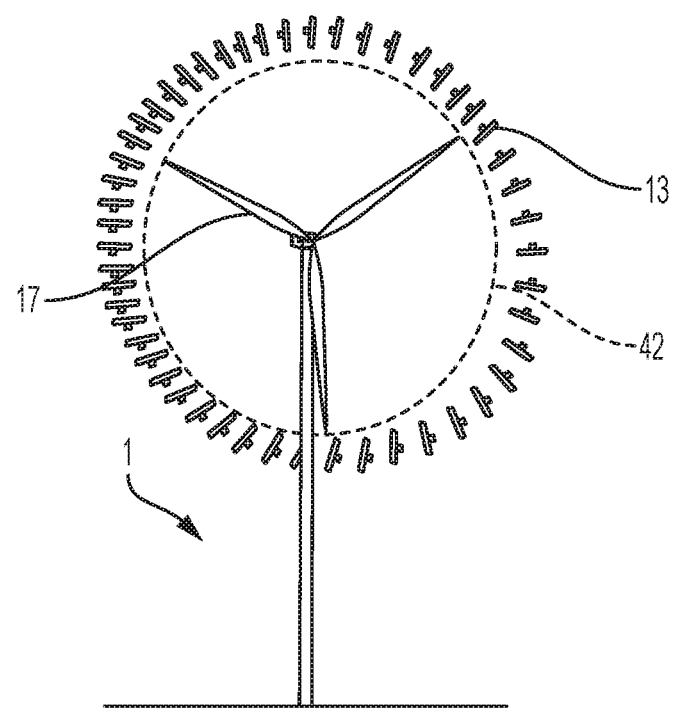
FIG. 24 illustrates operation of the wind installation illustrated in FIG. 23.

FIG. 24 illustrates operation of the wind installation illustrated in FIG. 23, where movement of the airborne wind energy system 13 is controlled so that the rotational movement hereof is outside the flow area 42 (illustrated by the dotted line).

EMBODIMENTS

The invention may e.g. be covered by the following embodiments:

Embodiment 1. A wind turbine (1) comprising a tower (2) placed on a foundation on a wind turbine site, the wind turbine (1) further comprising at least one nacelle (3) mounted on the tower (2) and a rotor (4) coupled to each nacelle (3) generating electrical energy for a power grid, the wind turbine (1) being electrically connected to the power grid via a power transmission line (27), the wind turbine (1) further comprising an airborne wind energy system (12, 13) for generating electrical energy, the airborne wind energy system (12, 13) being coupled to the wind turbine (1) via a cable (6) and electrically connected to the power transmission line (27).

Embodiment 2. A wind turbine (1) according to embodiment 1, wherein the airborne wind energy system (12, 13) is mechanically coupled to a drivetrain of the wind turbine (1).

Embodiment 3. A wind turbine (1) according to embodiment 1 or 2, wherein the airborne wind energy system (12, 13) comprises at least one separate generator.

Embodiment 4. A wind turbine (1) according to embodiment 3, wherein the airborne wind energy system (13) comprises at least one airborne generator.

Embodiment 5. A wind turbine (1) according to embodiment 3, wherein the airborne wind energy system (12, 13) comprises at least one generator positioned in the nacelle (3).

Embodiment 6. A wind turbine (1) according to any of embodiments 3-5, wherein the separate generator is coupled to a converter unit and/or a transformer (11) of the wind turbine (1).

Embodiment 7. A wind turbine (1) according to any of the preceding embodiments, wherein one end of the cable (6) of the airborne wind energy system (12, 13) is mounted on the nacelle (3).

Embodiment 8. A wind turbine (1) according to embodiment 7, wherein the airborne wind energy system (12, 13) is mounted on the nacelle (3) via a mounting base (24) being rotatably connected to the nacelle (3).

Embodiment 9. A wind turbine (1) according to any of embodiments 1-6, wherein one end of the cable (6) of the airborne wind energy system (12, 13) is mounted to the foundation or the tower (2) of the wind turbine (1).

Embodiment 10. A wind turbine (1) according to embodiment 9, wherein the cable (6) is mounted via a bearing system (18) arranged circumferentially with respect to the tower (2).

Embodiment 11. A wind turbine (1) according to embodiment 10, wherein the bearing system (18) is arranged at some height and/or near the ground.

Embodiment 12. A wind turbine (1) according to any of the preceding embodiments, wherein the wind turbine (1) comprises a control system for controlling the operation of the airborne wind energy system (12, 13) in dependence on the wind turbine operation.

Embodiment 13. A wind energy park comprising a number of wind turbines (1) wherein at least one wind turbine (1) is a wind turbine (1) according to any of the preceding embodiments.

Embodiment 14. A method for controlling the operation of a wind turbine (1), the wind turbine (1) comprising a tower (2) placed on a foundation, the wind turbine (1) further comprising at least one nacelle (3) mounted on the tower (2) via a yaw bearing and a rotor (4) coupled to each nacelle (3) generating electrical energy for a power grid, the wind turbine (1) further comprising an airborne wind energy system (12, 13) for generating electrical energy, the method comprising controlling the operation of the airborne wind energy system (12, 13) in dependence on the wind turbine operation.

Embodiment 15. A method according to embodiment 14 wherein the airborne wind energy system (12, 13) is launched when the power production of the wind turbine (1) is below a rated power for the wind turbine (1).

Embodiment 16. A method according to embodiment 14 or 15, wherein the airborne wind energy system (12, 13) is retracted when the power production of the wind turbine (1) reaches a rated power for the wind turbine (1).

Embodiment 17. A method according to any of embodiments 14-16, wherein the airborne wind energy system (12, 13) is retracted at wind speeds above a predefined wind speed upper threshold.

Embodiment 18. A method according to any of embodiments 14-17, wherein operation of the wind turbine (1) is stopped during launch and/or retraction of the airborne wind energy system (12, 13).

The invention claimed is:

1. A wind installation, comprising:
 a wind turbine comprising a tower placed on a foundation on a wind turbine site, the wind turbine further comprising at least one nacelle mounted on the tower and for each nacelle, a rotor coupled to the nacelle and being rotatable about an axis of rotation, the rotor being connected to a generator for converting energy of the rotating rotor into electrical energy for a power grid, the wind turbine being electrically connected to the power grid via a power transmission line; and
 an airborne wind energy system comprising a separate generator for generating electrical energy, the airborne wind energy system being coupled to the wind turbine via a cable and the separate generator being electrically connected to the power grid;
 wherein one end of the cable of the airborne wind energy system is mounted on the nacelle.

2. The wind installation according to claim 1, wherein the separate generator is an airborne generator.

3. The wind installation according to claim 1, wherein the separate generator is positioned in the nacelle.

4. The wind installation according to claim 1, wherein the separate generator is coupled to a converter unit and/or a transformer of the wind turbine.

5. The wind installation according to claim 1, wherein the airborne wind energy system is mounted on the nacelle via a mounting base being rotatably connected to the nacelle.

6. The wind installation according to claim 1, further comprising a control system for controlling an operation of the airborne wind energy system in dependence on an operation of the wind turbine.

7. A wind energy park comprising a number of wind installations wherein at least one wind installation is a wind installation according to claim 1.

8. The wind installation according to claim 1, further comprising a control structure configured to extract and retract the cable to thereby control movement of a part of the airborne wind energy system which is moved to a higher altitude.

9. The wind installation according to claim 8, wherein the control structure is configured to execute a predetermined movement pattern of the cable effecting rotational movement of the airborne wind energy system.

10. The wind installation according to claim 9, wherein the rotor defines a rotational plane, the rotational plane defining a substantially cone-shaped flow area axially aligned along the axis of rotation, and wherein the rotational movement of the airborne wind energy system is outside the cone-shaped flow area.

11. The wind installation according to claim 9, wherein the rotational movement of the airborne wind energy system is substantially circular.

12. A method for controlling operation of a wind installation, comprising:
 providing the wind installation of claim 1; and
 controlling operation of the airborne wind energy system in dependence on operation of the wind turbine.

13. The method according to claim 12, wherein the airborne wind energy system is launched when electrical energy production of the wind turbine is below a rated power for the wind turbine.

14. The method according to claim 12, wherein the airborne wind energy system is retracted when electrical energy production of the wind turbine reaches a rated power for the wind turbine.

15. The method according to claim 12, wherein the airborne wind energy system is retracted at wind speeds above a predefined wind speed upper threshold.

16. The method according to claim 12, wherein the operation of the wind turbine is stopped during launch and/or during retraction of the airborne wind energy system.

* * * * *